United States Patent
Lee et al.

(10) Patent No.: US 12,541,133 B2
(45) Date of Patent: Feb. 3, 2026

(54) SPATIAL LIGHT MODULATORS, METHODS OF DRIVING AND MANUFACTURING THE SAME, AND APPARATUSES INCLUDING THE SPATIAL LIGHT MODULATORS

(71) Applicant: SAMSUNG ELECTRONICS CO., LTD., Suwon-si (KR)

(72) Inventors: Minkyung Lee, Suwon-si (KR); Sunil Kim, Osan-si (KR); Junghyun Park, Seoul (KR); Byunggil Jeong, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 983 days.

(21) Appl. No.: 17/706,100

(22) Filed: Mar. 28, 2022

(65) Prior Publication Data
US 2023/0123994 A1    Apr. 20, 2023

(30) Foreign Application Priority Data
Oct. 19, 2021  (KR) .................. 10-2021-0139692

(51) Int. Cl.
*G02F 1/29* (2006.01)
(52) U.S. Cl.
CPC .................. *G02F 1/292* (2013.01)
(58) Field of Classification Search
CPC ..... G02F 1/292; G02F 1/0147; G02B 26/001; G02B 26/0833; G02B 26/002
See application file for complete search history.

(56) References Cited

U.S. PATENT DOCUMENTS

| | | |
|---|---|---|
| 2018/0196137 A1* | 7/2018 | Lee .................. G01S 7/481 |
| 2021/0208256 A1 | 7/2021 | Kim et al. |
| 2022/0013905 A1 | 1/2022 | Park et al. |
| 2022/0050354 A1 | 2/2022 | Park et al. |
| 2022/0137402 A1 | 5/2022 | Park et al. |
| 2022/0171027 A1 | 6/2022 | Kim et al. |
| 2022/0197105 A1 | 6/2022 | Park et al. |
| 2022/0344400 A1* | 10/2022 | Suzuki .................. H10F 39/811 |
| 2023/0117032 A1 | 4/2023 | Kim et al. |

FOREIGN PATENT DOCUMENTS

| | | |
|---|---|---|
| JP | 2001-267639 A | 9/2001 |
| JP | 2004-71609 A | 3/2004 |
| JP | 2020-166113 A | 10/2020 |
| KR | 10-2018-0082305 A | 7/2018 |
| KR | 10-2020-71909 A | 6/2020 |
| KR | 10-2021-0088047 A | 7/2021 |
| KR | 10-2022-0007004 A | 1/2022 |
| KR | 10-2022-0007006 A | 1/2022 |

* cited by examiner

*Primary Examiner* — Mariam Qureshi
(74) *Attorney, Agent, or Firm* — Sughrue Mion, PLLC

(57) ABSTRACT

Provided is a spatial light modulator includes a substrate; a distributed Bragg reflector (DBR) layer provided on a surface of the substrate; a cavity layer provided on the DBR layer; a pixel layer provided on the cavity layer, the pixel layer including a plurality of pixels; and a heat blocking member provided between the plurality of pixels and configured to block heat transfer between the plurality of pixels, wherein each of the plurality of pixels includes a plurality of active meta-patterns.

22 Claims, 41 Drawing Sheets

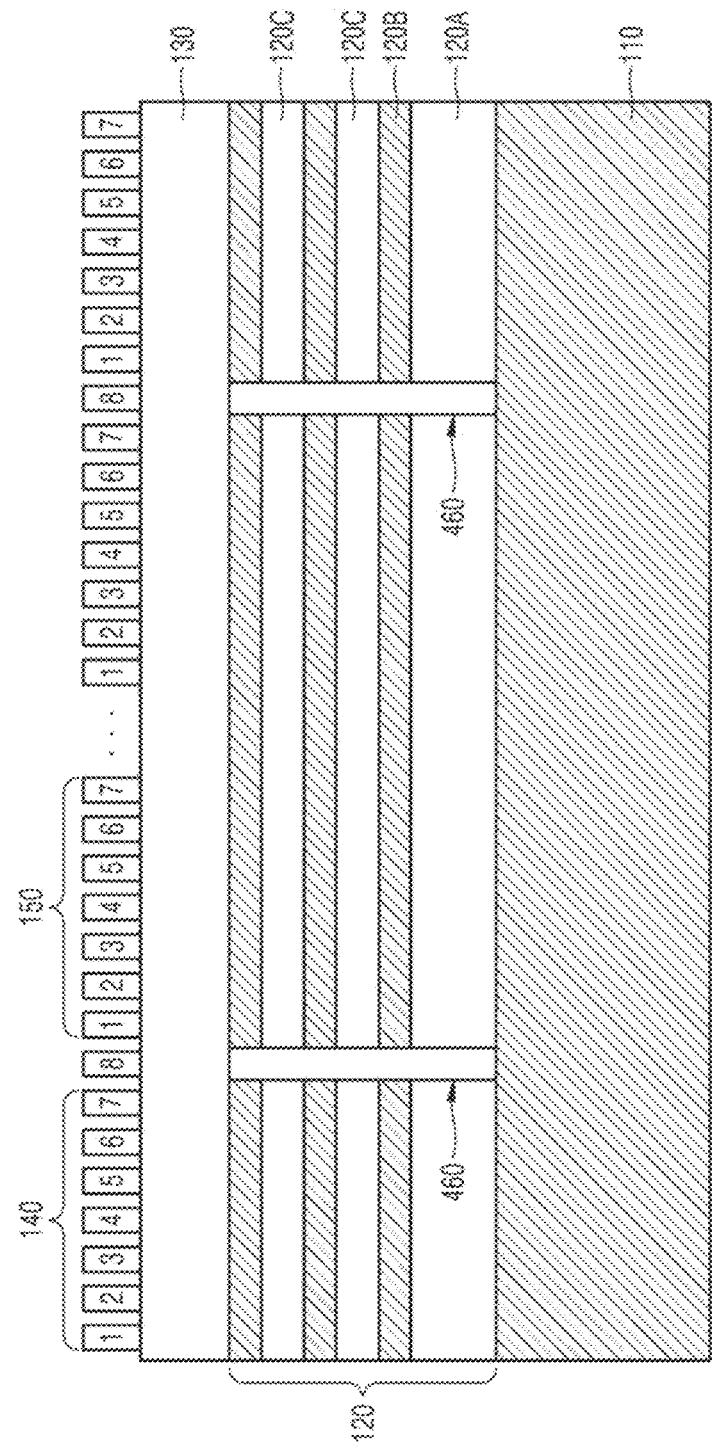

SPATIAL LIGHT MODULATORS, METHODS OF DRIVING AND MANUFACTURING THE SAME, AND APPARATUSES INCLUDING THE SPATIAL LIGHT MODULATORS

CROSS-REFERENCE TO RELATED APPLICATION

This application is based on and claims priority under 35 U.S.C. § 119 to Korean Patent Application No. 10-2021-0139692, filed on Oct. 19, 2021 in the Korean Intellectual Property Office, the disclosure of which is incorporated by reference herein in its entirety.

BACKGROUND

1. Field

Example embodiments of the present disclosure relate to optical scanners for radiating incident light in a given direction, and more particularly, to spatial light modulators, methods of driving and manufacturing the same, and apparatuses including the spatial light modulators.

2. Description of Related Art

A spatial light modulator (SLM) may adjust an emission angle of incident light, and thus, may be used as an optical scanner. Recently, a spatial light modulator using an active meta-device has been introduced.

A spatial light modulator using an active meta-device includes a meta-surface, a distributed Bragg reflector (DBR) which serves as a mirror, and a cavity.

The meta-surface of the spatial light modulator may include a plurality of high contrast gratings (HCGs). Because both the HCG and DBR have a high reflectivity with respect to incident light, vertical incident light may be amplified in the cavity and vertically emitted.

SUMMARY

One or more example embodiments provide spatial light modulators capable of preventing thermal cross-talk between driving pixels or heat interference between adjacent driving pixels.

One or more example embodiments also provide methods of driving and manufacturing the spatial light modulators.

One or more example embodiments also provide electronic apparatuses including the spatial light modulators.

Additional aspects will be set forth in part in the description which follows and, in part, will be apparent from the description, or may be learned by practice of example embodiments.

According to an aspect of an example embodiment, a spatial light modulator includes: a substrate; a distributed Bragg reflector (DBR) layer provided on a surface of the substrate; a cavity layer provided on the DBR layer; a pixel layer provided on the cavity layer, the pixel layer including a plurality of pixels; and a heat blocking member provided between the plurality of pixels and configured to block heat transfer between the plurality of pixels, wherein each of the plurality of pixels includes a plurality of active meta-patterns.

Each of the DBR layer and the cavity layer may be divided corresponding to the plurality of pixels, and the heat blocking member is provided between the divided DBR layers and between the divided cavity layers.

The DBR layer may include: a plurality of first layers, each first layer of the plurality of first layers having a certain thermal conductivity; and a plurality of second layers, each second layer of the plurality of second layers having a thermal conductivity greater than the certain thermal conductivity of the first layer, wherein the plurality of the first layers and the plurality of second layers are repeatedly alternately stacked, and wherein a thickness of a lowermost first layer from among the plurality of first layers is greater than a thickness of each of remaining first layers from among the plurality of first layers.

The cavity layer may be divided in correspondence with the plurality of pixels, and a portion of layers included in the DBR layer are divided in correspondence with the plurality of pixels, and wherein the heat blocking member is provided between the divided cavity layers and between all the divided layers of the DBR layer in a horizontal direction parallel to an upper surface of the substrate.

The DBR layer may include a plurality of first layers and a plurality of second layers having thermal conductivities different from each other and being repeatedly and alternately stacked in a vertical direction, among the plurality of first layers and the plurality of second layers, layers having a high thermal conductivity are divided, and layers having a low thermal conductivity are divided except for a lowermost layer.

The heat blocking member and the substrate may be spaced apart, and the DBR layer may include an undivided layer having a low thermal conductivity between the substrate and the heat blocking member.

Among the layers having a low thermal conductivity, a thickness of the lowermost layer may be greater than a thickness of each of remaining layers.

The DBR layer may be divided in correspondence to the plurality of pixels, and the heat blocking member is provided between the divided DBR layers.

The DBR layer may include: a plurality of first layers having a first thermal conductivity; and a plurality of second layers having a second thermal conductivity greater than the first thermal conductivity of the plurality of first layers, wherein the plurality of the first layers and the plurality of second layers are repeatedly alternately stacked, and wherein, among the plurality of first layers, a thickness of a lowermost first layer is greater than a thickness of each of remaining first layers.

The spatial light modulator may further include a meta-pattern on the cavity layer between the plurality of pixels.

The heat blocking member may include a trench.

A thermal conductivity of a material of the heat blocking member may be less than a thermal conductivity of the substrate, a thermal conductivity of the DBR layer, and a thermal conductivity of the cavity layer.

The heat blocking member may be spaced apart from the plurality of pixels.

The plurality of pixels may include: a plurality of driving pixels; and a plurality of non-driving pixels, wherein the plurality of driving pixels and the plurality of non-driving pixels are configured to be driven by binary driving during driving.

Each of the plurality of active meta-patterns may include an active high contrast grating (HCG).

The plurality of pixels may be spaced apart from each other, and a distance between the plurality of pixels may be greater than a width of a meta-pattern.

The plurality of pixels may include: a plurality of driving pixels; and a plurality of non-driving pixels, wherein the plurality of driving pixels and the plurality of non-driving pixels are configured to be driven based on binary driving.

The plurality of driving pixels and the plurality of non-driving pixels may be spaced apart from each other, wherein the plurality of driving pixel may include a plurality of active meta-patterns, and wherein a current is applied to all of the plurality of active meta-patterns included in the plurality of driving pixels.

The plurality of driving pixels and the non-driving pixels may be spaced apart from each other, and a current may be applied to a portion of the plurality of active meta-patterns included in the driving pixel.

The spatial light modulator may further include an active meta-pattern provided between the plurality of driving pixels and the plurality of non-driving pixels, and a current may be applied to all of the plurality of active meta-patterns included in the plurality of driving pixels.

The spatial light modulator may further include an active meta-pattern provided between the plurality of driving pixels and the plurality of non-driving pixels, and a current may be applied to a portion of the plurality of active meta-patterns included in the plurality of driving pixels.

According to an aspect of an example embodiment, method of manufacturing a spatial light modulator, the method including: forming a distributed Bragg reflector (DBR) layer on a substrate; forming a cavity layer on the DBR layer; forming a pixel layer including a plurality of pixels on the cavity layer; and forming a trench in the DBR layer and the cavity layer between the plurality of pixels.

The forming of the trench may include sequentially etching the cavity layer and the DBR layer until the substrate is exposed.

The forming of the trench may include sequentially etching the cavity layer and the DBR layer, and a portion of the DBR layer may be etched.

The DBR layer may include first layers and second layers having different thermal conductivities being repeatedly alternately stacked, and the etching of a portion of the DBR layer may include etching the DBR layer except for the lowermost first layer among the first layers.

The forming of the trench may include, after forming the DBR layer, etching a region of the DBR layer corresponding to an area between the plurality of pixels until the substrate is exposed, and the cavity layer may be formed on the DBR layer to be provided on a space formed by the etching.

Each of the plurality of pixels may include a plurality of active high contrast gratings (HCGs), and in the forming of the pixel layer, one active HCG may be formed on the cavity layer between the plurality of pixels.

The forming of the DBR layer may include: forming a first layer directly on the substrate; forming a second layer on the first layer; and repeatedly alternately forming first layers and second layers on the second layer, wherein among the first layers, a thickness of the first layer directly formed on the substrate is formed to be greater than a thickness of each of the remaining first layers.

The method may further include, after forming the trench, filling the trench with a material having a thermal conductivity less than a thermal conductivity of the substrate, a thermal conductivity of the DBR layer, and a thermal conductivity of the cavity layer.

According to an aspect of an example embodiment, apparatus including a spatial light modulator configured to radiate incident light, the spatial light modulator including: a substrate; a distributed Bragg reflector (DBR) layer provided on a surface of the substrate; a cavity layer on the DBR layer; a pixel layer provided on the cavity layer, the pixel layer including a plurality of pixels; and a heat blocking member between the plurality of pixels and configured to block heat transfer between the plurality of pixels, wherein each of the plurality of pixels may include a plurality of active meta-patterns.

BRIEF DESCRIPTION OF THE DRAWINGS

The above and/or other aspects, features, and advantages of certain example embodiments of the disclosure will be more apparent from the following description taken in conjunction with the accompanying drawings, in which:

FIGS. 38, 39, 40, and 41 are cross-sectional views illustrating by step a method of manufacturing a spatial light modulator according to an example embodiment.

DETAILED DESCRIPTION

Figure 1:
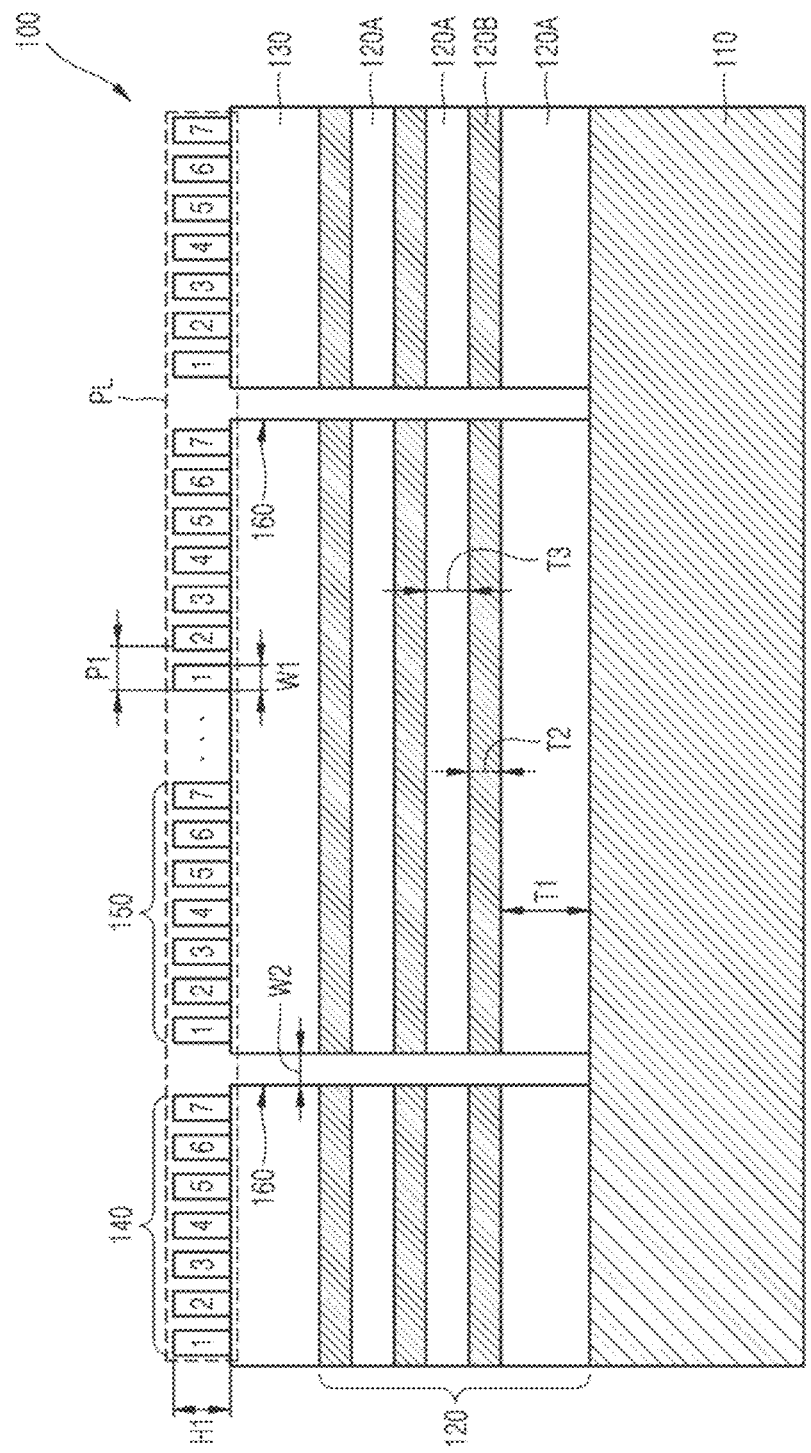
FIG. 1 is a cross-sectional view illustrating a first spatial light modulator according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, an apparatus including a spatial optical modulator according to an example embodiment and methods of driving and manufacturing the spatial light modulator will be described in detail with reference to the accompanying drawings. In the drawings, thicknesses of layers or regions may be somewhat exaggerated for the clarity of the specification. Meanwhile, the following embodiments described below are merely illustrative, and various modifications may be possible from the embodiments of the present disclosure. Also, when an element or layer is referred to as being "on" or "above" another element or layer, the element or layer may be directly on another element or layer or intervening elements or layers. In the drawings, like reference numerals refer to like elements throughout.

FIG. 1 is a cross-sectional view illustrating a first spatial light modulator 100 according to an example embodiment.

Referring to FIG. 1, the first spatial light modulator 100 includes a substrate 110, and a distributed Bragg reflector (DBR) layer 120, a cavity layer 130, and a pixel layer PL sequentially stacked on one surface of the substrate 110. In one example, the one surface of the substrate 110 may be an upper surface of the substrate 110, but may be a lower surface or a side surface according to a viewpoint. The first spatial light modulator 100 also includes a plurality of first trenches 160 penetrating through the DBR layer 120 and the cavity layer 130. The first spatial light modulator 100 may further include a different element besides the elements described above.

In one example, the substrate 110 may be a semiconductor substrate, for example, a silicon substrate, and but is not limited thereto. The thickness of the substrate 110 may be determined in consideration of several factors, for example, a form factor and/or heat dissipation when the first spatial light modulator 100 is applied to a product.

In one example, the DBR layer 120 includes a plurality of first layers 120A and second layers 120B that are repeatedly and alternately stacked in a direction perpendicular to the one surface of the substrate 110 and have different thermal conductivities and refractive indices from one another. The first and second layers 120A and 120B may all have different thermal conductivities and refractive indices from one another. The thermal conductivity of the first layer 120A may be less than that of the second layer 120B. In one example, the first layer 120A may include a silicon oxide ($SiO_2$) layer, but is not limited thereto. In one example, the second layer 120B may include a semiconductor layer, for example, a silicon (Si) layer, but is not limited thereto. In the DBR layer 120, a thickness of the lowermost first layer 120A that is in direct contact with the one surface of the substrate 110 may be different from the thickness of the other first layers 120A of the DBR layer 120. In one example, a thickness T1 of the lowermost first layer 120A may be greater than a thickness T3 of the other first layers 120A. The thickness T3 of the other first layers 120A except for the lowermost first layer 120A may be the same or substantially the same as each other. In one example, the thickness T3 of other first layers 120A except for the lowermost first layer 120A satisfies the following Equation 1.

$$T3=\lambda/(4\times n1) \qquad \text{<Equation 1>}$$

In Equation 1, A represents a wavelength of light (e.g., infrared band) incident on the first spatial light modulator 100, and n1 represents the refractive index of the first layer 120A. Equation 1 may be applied to other spatial light modulators described below.

In one example, when a wavelength A of light incident on the first spatial light modulator 100 is 1550 nm, and the refractive index n1 of the first layer 120A is 1.46, the thickness T3 of the first layer 120A other than the lowermost first layer 120A is about 265 nm according to Equation 1.

In one example, the thickness T1 of the lowermost first layer 120A may be about 2 to 20 times the thickness T3 of the other first layers 120A, for example, may be 2 to 10 times, or may be to some extent 5 times.

The thickness T2 of the second layer 120B may be less than that of the first layer 120A. The thickness T2 of the second layer 120B satisfies the following Equation 2.

$$T2=\lambda/(4\times n2) \qquad \text{<Equation 2>}$$

In Equation 2, λ represents a wavelength of light incident on the first spatial light modulator 100, and n2 represents a refractive index of the second layer 120B. Equation 2 may be applied to other spatial light modulators described below.

In one example, when a wavelength A of light incident on the first spatial light modulator 100 is 1550 nm, and a refractive index n2 of the second layer 120B is 3.28, the thickness T2 of the second layer 120B is about 118 nm according to Equation 2.

According to FIG. 1, the first and second layers 120A and 120B in the DBR layer 120 are repeatedly stacked three times, but the first and second layers 120A and 120B may be alternately stacked three times or less or three times or more. In the DBR layer 120, the uppermost layer is a second layer 120B and is directly contacted with the cavity layer 130.

The cavity layer 130 that is provided between the DBR layer 120 and the pixel layer PL and resonates and amplifies incident light may be a single layer. The cavity layer 130 may include a material layer having low thermal conductivity. For example, the thermal conductivity of the cavity layer 130 may be less than the thermal conductivity of the second layer 120B of the DBR layer 120. In one example, the cavity layer 130 may include a silicon oxide layer, but is not limited thereto. The thickness of the cavity layer 130 may vary depending on a wavelength of incident light. In one example, the cavity layer 130 may have a thickness (λ/3) corresponding to ⅓ of the wavelength of the incident light, but is not limited thereto. For example, the thickness of the cavity layer 130 may be less or greater than λ/3. As an example, when a wavelength A of incident light is 1550 nm, the cavity layer 130 may be designed so that optimum resonance occurs in a thickness range from about 500 nm to about 600 nm.

The pixel layer PL includes a plurality of high contrast gratings (HCGs). The shape and dimension of the plurality of HCGs may be the same or substantially the same as each other. A width W1 and height H1 of each HCG may be less than a wavelength of incident light. The height H1 of each HCG may be designed to have a high reflectance with respect to incident light, for example, it may be designed to have a reflectance of 70% or more. The plurality of HCGs may be arranged one-dimensionally (1D). In addition, in the plurality of HCGs, the arrangement period P1 of each HCG may be shorter than a wavelength of incident light. In this regard, the pixel layer PL may be referred to as an active meta-surface or an active meta-surface layer, and each HCG may be referred to as an active meta-pattern or an active meta diffraction pattern. A material of each HCG may include, but is not limited to, crystalline silicon.

For convenience of description, the plurality of HCGs of the pixel layer PL are divided into a plurality of first pixels 140 and a plurality of second pixels 150. For example, it is assumed that the pixel layer PL includes a plurality of first pixels 140 and a plurality of second pixels 150. The first pixel 140 and the second pixel 150 are spaced apart from each other.

In one example, each of the plurality of first pixels 140 may include first to seventh HCGs 1 to 7, but is not limited thereto. The first pixel 140 may include 7 or less or 7 or more HCGs. In one example, each of the plurality of second pixels 150 may include the first to seventh HCGs 1 to 7, but is not limited thereto. The second pixel 150 may include 7 or less or 7 or more HCGs. An interval between the HCGs 1-7 included in the first and second pixels 140 and 150 may be equal to or substantially equal to each other. The interval between the HCGs 1-7 included in the first and second pixels 140 and 150 is less than an interval between the first and second pixels 140 and 150.

Upper and lower portions of each of the HCGs 1 to 7 included in the first and second pixels 140 and 150 may be doped regions. In one example, the doped regions may be regions doped with an n-type or p-type dopant. Accordingly, a current may flow through each of the HCGs 1 to 7.

When a current is applied to each of the HCGs 1 to 7, joule heat is generated due to an internal resistance of each of the HCGs 1 to 7, and thus, the temperature of the corresponding HCG increases. Due to the temperature change, the refractive index of each of the HCGs 1 to 7 and the reflectance of incident light may be sequentially changed.

Using this principle, a modulation unit may be formed by using the plurality of HCGs 1 to 7 as one pixel 140 (or 150). A current may be applied to some pixels (e.g., 150) according to a specific current application pattern, and as a result, an angle of emitting light (primary reflected light) may be adjusted. Therefore, beam scanning is possible by changing the current application pattern.

The trench 160 is positioned between the first pixel 140 and the second pixel 150. An HCG is not present on the cavity layer 130 just above the trench 160. The trench 160 is formed through the cavity 130 and the DBR layer 120.

Because FIG. 1 is a cross-sectional view, the trench 160 penetrates through a stack structure including the cavity 130 and the DBR layer 120, so it may be expressed as a through hole, but because the trench 160 is formed between the plurality of pixels 140 and 150, the cavity layer 130 and the DBR layer 120 may be divided to correspond to the plurality of pixels 140 and 150. For example, because the trench 160 is provided, the cavity layer 130 formed under the first pixel 140 and the second pixel 150 is not connected to each other and is in a disconnected state, and the DBR layer 120 is also in the same disconnected state. In this way, heat generated in the driving pixel (e.g., 150) may be blocked from being transferred to the non-driving pixel (e.g., 140).

As illustrated in an example embodiment below, a depth of the trench 160 may be adjusted, and thus, a range of layers disconnected by the trench 160 or a thickness disconnected within a layer may vary.

The trench 160 is in contact with the upper surface of the substrate 110. The upper surface of the substrate 110 exposed through the trench 160 becomes a bottom of the trench 160. A width W2 of the trench 160 may be less than a period P1 of the HCG. The width W2 of the trench 160 may be the same as or different from the width W1 of the HCG. The trench 160 may be filled with air or other material, or may maintain a vacuum state that is not filled with any material.

The DBR layer 120 and the cavity layer 130 may be divided to correspond to the respective pixels 140 and 150 by the trench 160. For example, the DBR layer 120 and the cavity layer 130 may be divided into the same number as the number of the plurality of first and second pixels 140 and 150 by the trench 160. Accordingly, the plurality of pixels 140 and 150 and the stacked DBR layer 120 and the cavity layer 130 may correspond one-to-one. For example, one pixel 140 or 150 exists on one divided cavity layer 130.

As described above, because the DBR layer 120 and the cavity layer 130 are physically divided to correspond one-to-one with the plurality of pixels 140 and 150 due to the trench 160, the transfer of heat generated in a driving pixel (e.g., 150) to an adjacent non-driving pixel (e.g., 140) may be minimized or blocked. In this regard, the trench 160 may be an example of a heat blocking member that blocks heat transfer between the pixels 140 and 150. When the trench 160 is filled with a material, the material may be a material having a less thermal conductivity than the cavity layer 130, the DBR layer 120, and the substrate 110. Accordingly, the material filling the trench 160 may also be regarded as an example of the heat blocking member. These contents may also be applied to trenches to be described later.

Due to the trench 160, independence of a driving pixel as well as independence of a non-driving pixel may be increased. In addition, a temperature difference between the driving pixel and the non-driving pixel is greater than that of a spatial light modulator of related art, and thus, emitting light may be focused at a desired location. In addition, because the intensity of a second or higher order beam or the 0th order beam may be reduced, an output and efficiency of the spatial light modulator may be increased. For example, the accuracy and efficiency of optical scan of the spatial light modulator may be increased.

Figure 2:
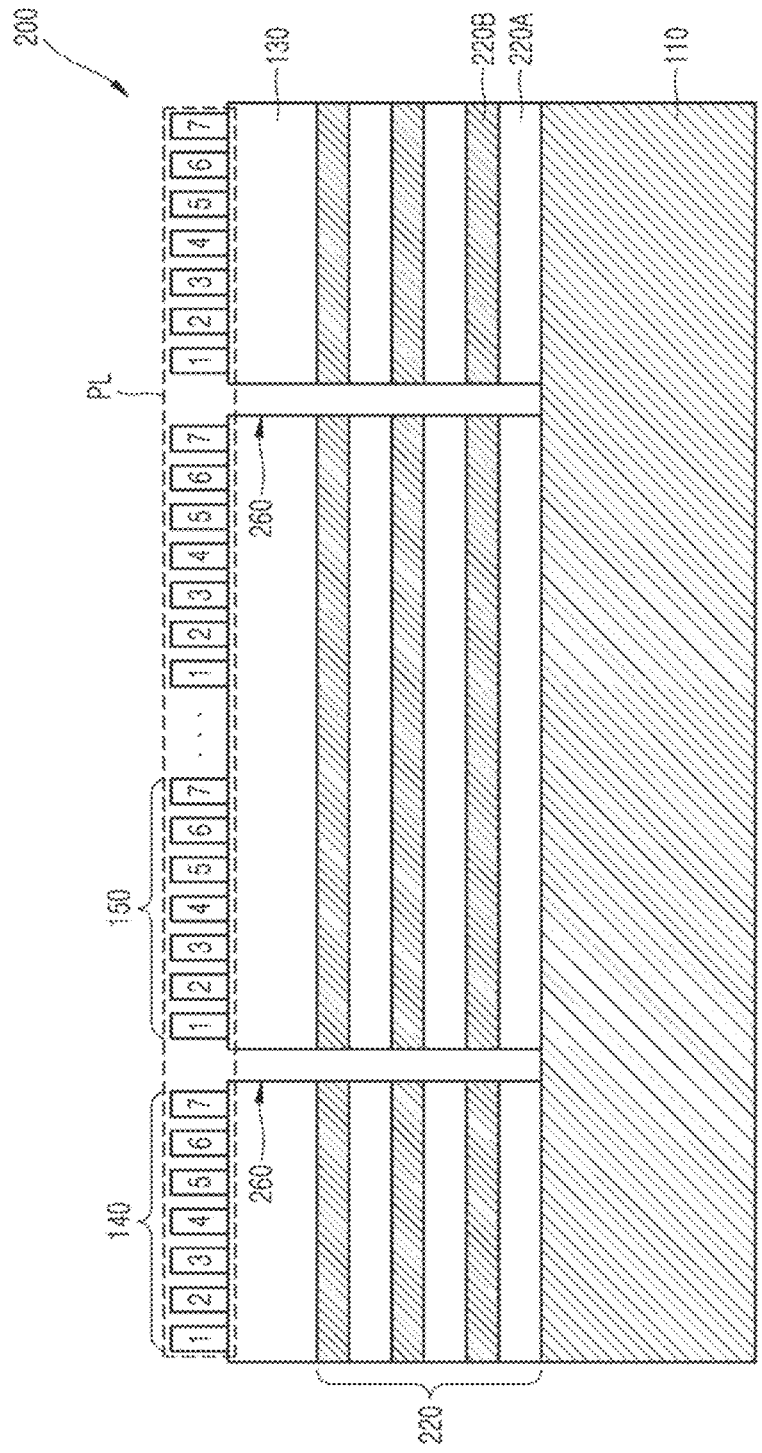
FIG. 2 is a cross-sectional view illustrating a second spatial light modulator according to an example embodiment.

FIG. 2 shows a second spatial light modulator 200 according to an example embodiment. Only parts different from the first spatial light modulator 100 will be described. Like reference numerals indicate like members, and the description thereof will be omitted. The same will be applied to the description of all drawings below.

Referring to FIG. 2, thicknesses of a plurality of first layers 220A included in a DBR layer 220 of the second spatial light modulator 200 may all be the same or substantially the same. Other than that, the configuration of the second spatial light modulator 200 may be the same as or substantially the same as that of the first spatial light modulator 100.

Figure 3:
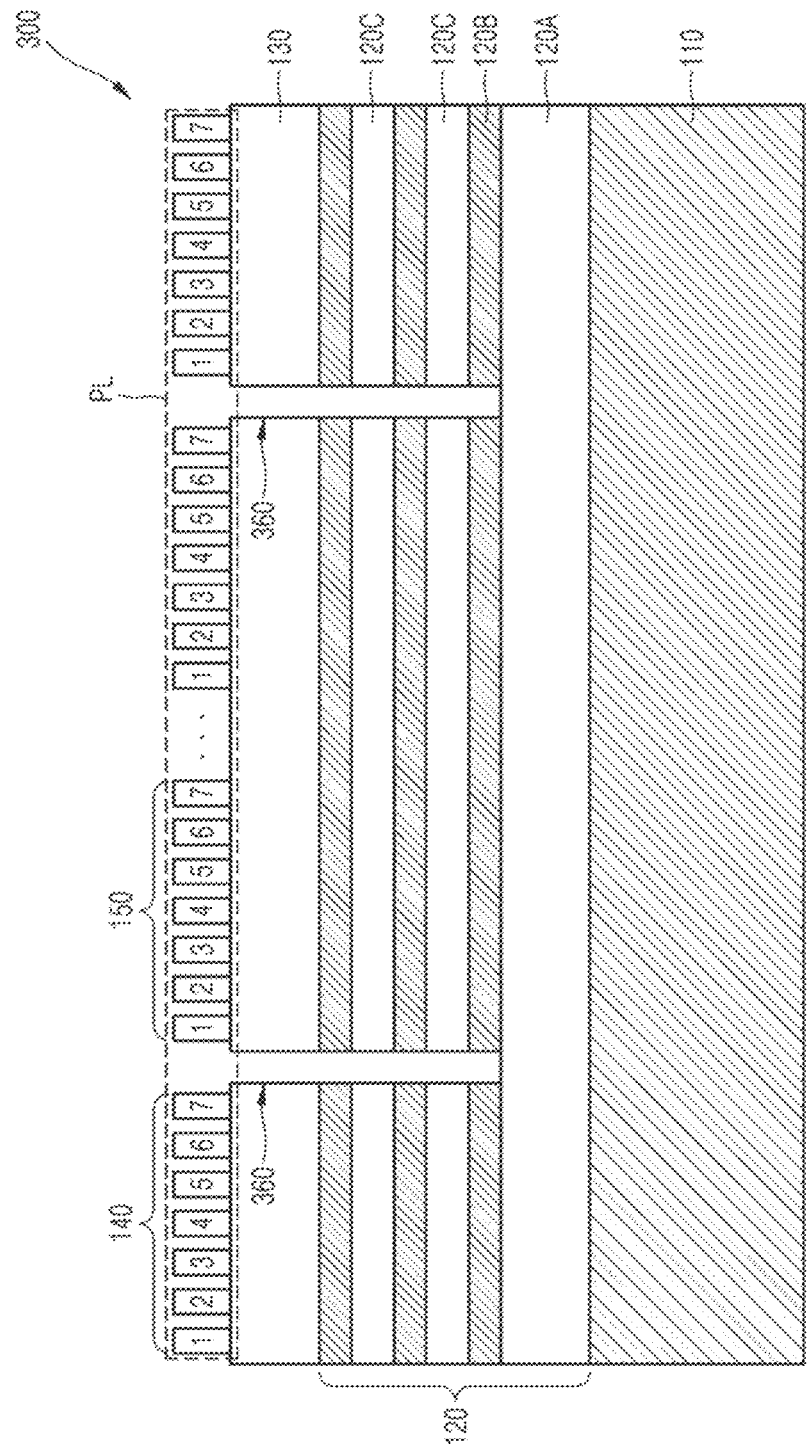
FIG. 3 is a cross-sectional view illustrating a third spatial light modulator according to an example embodiment.

FIG. 3 shows a third spatial light modulator 300 according to an example embodiment. Only parts different from the first spatial light modulator 100 will be described.

Referring to FIG. 3, the third spatial light modulator 300 includes a trench 360. The position, width, etc. of the trench 360 may be the same as or substantially the same as that of the trench 160 of the first spatial light modulator 100, but the trench 360 does not penetrate through the lowermost layer 120A of the DBR layer 120. The trench 360 penetrates through the cavity layer 130, and only penetrates through the remaining layers except for the lowermost layer 120A of the DBR layer 120. The trench 360 penetrates through all of the second layer 120B having relatively high thermal conductivity in the DBR layer 120. A surface of the lowermost layer 120A of the DBR layer 120 exposed through the trench 360 may be a bottom of the trench 360.

Figure 4:
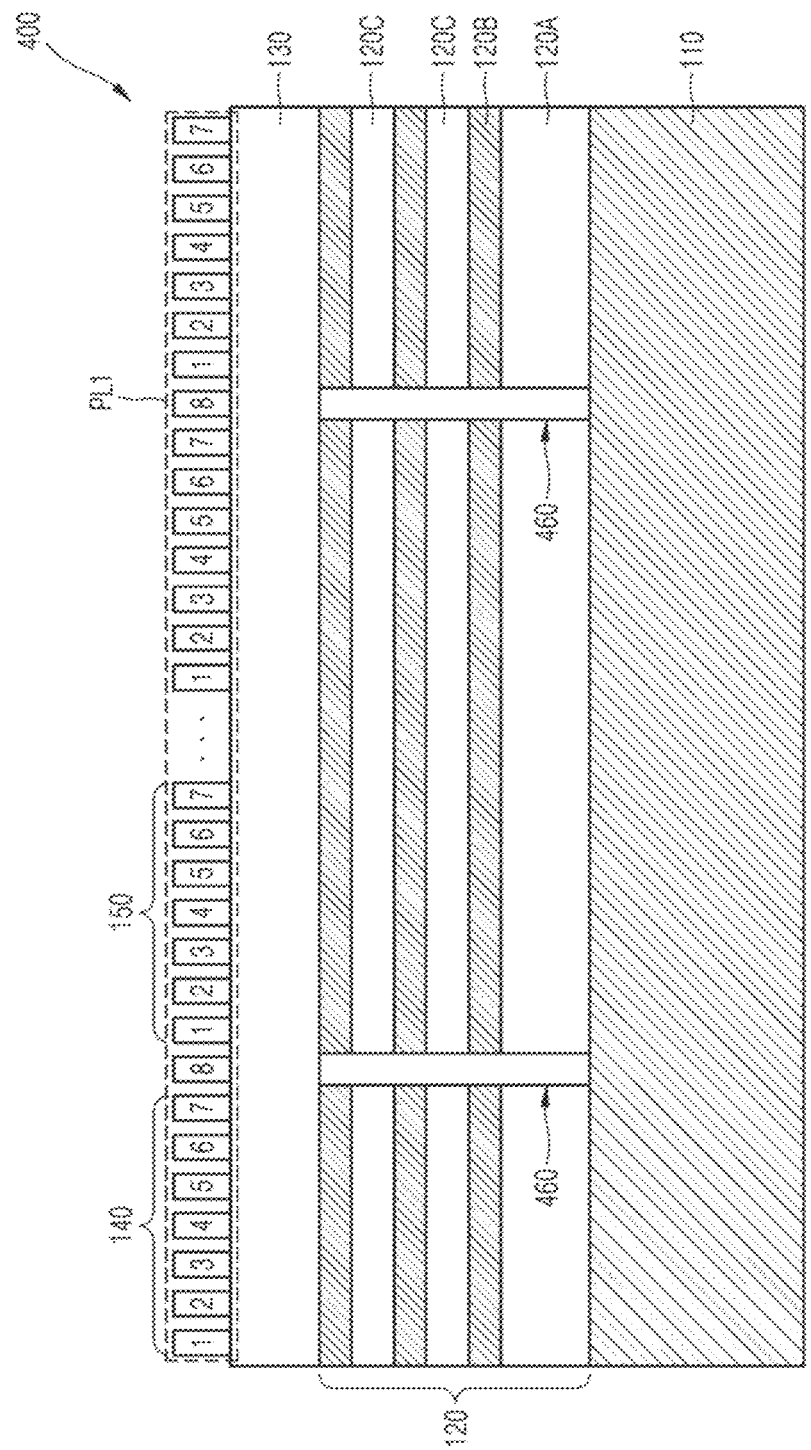
FIG. 4 is a cross-sectional view illustrating a fourth spatial light modulator according to an example embodiment.

FIG. 4 shows a fourth spatial light modulator 400 according to an example embodiment.

Only parts different from the first spatial light modulator 100 will be described.

Referring to FIG. 4, the fourth spatial light modulator 400 includes a trench 460 that penetrates through the DBR layer 120 and does not penetrates through the cavity layer 130. For example, the trench 460 exists between the substrate 110 and the cavity layer 130. An entrance of the trench 460 is covered by the cavity layer 130, and the trench 460 may be viewed as a void formed in a stack structure including sequentially stacked the substrate 110, the DBR layer 120, and the cavity layer 130.

A position of the trench 460 in a horizontal direction parallel to the length of the substrate 110 may be the same as or substantially the same as that of the trench 160 of the first spatial light modulator 100. An eighth HCG 8 is present on a region of the cavity layer 130 corresponding to the trench 460, that is, between the first and second pixels 140 and 150. In the pixel layer PL1 formed on the cavity layer 130, the eighth HCG 8 may be included in the first pixel 140 or the second pixel 150. In an example, the eighth HCG 8 may be provided as a dummy pattern to which no current is applied.

Figure 5:
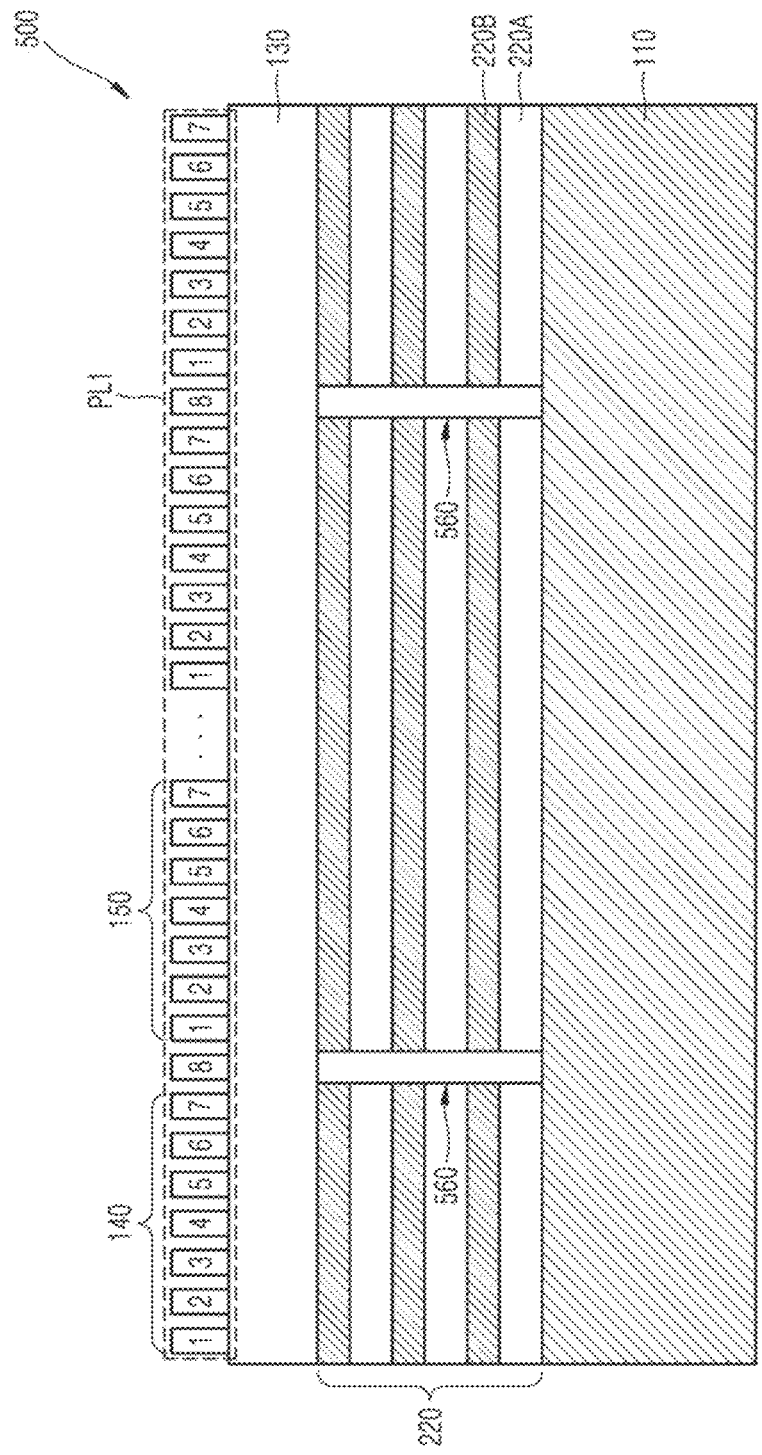
FIG. 5 is a cross-sectional view illustrating a fifth spatial light modulator according to an example embodiment.

FIG. 5 shows a fifth spatial light modulator 500 according to an example embodiment.

Only parts different from the fourth spatial light modulator 400 of FIG. 4 will be described.

Referring to FIG. 5, the DBR layer 220 of the fifth spatial light modulator 500 includes a plurality of first layers 220A and a plurality of second layers 220B. The thicknesses of the plurality of first layers 220A may be the same or substantially the same as each other. In addition, the fifth spatial light modulator 500 includes a trench 560 penetrating through only the DBR layer 220. Otherwise, the rest of the configuration of the fifth spatial light modulator 500 may be the same as or substantially the same as that of the fourth spatial light modulator 400.

Next, a method of driving (operating) the spatial light modulator according to the example embodiments described above will be described.

Figure 6:
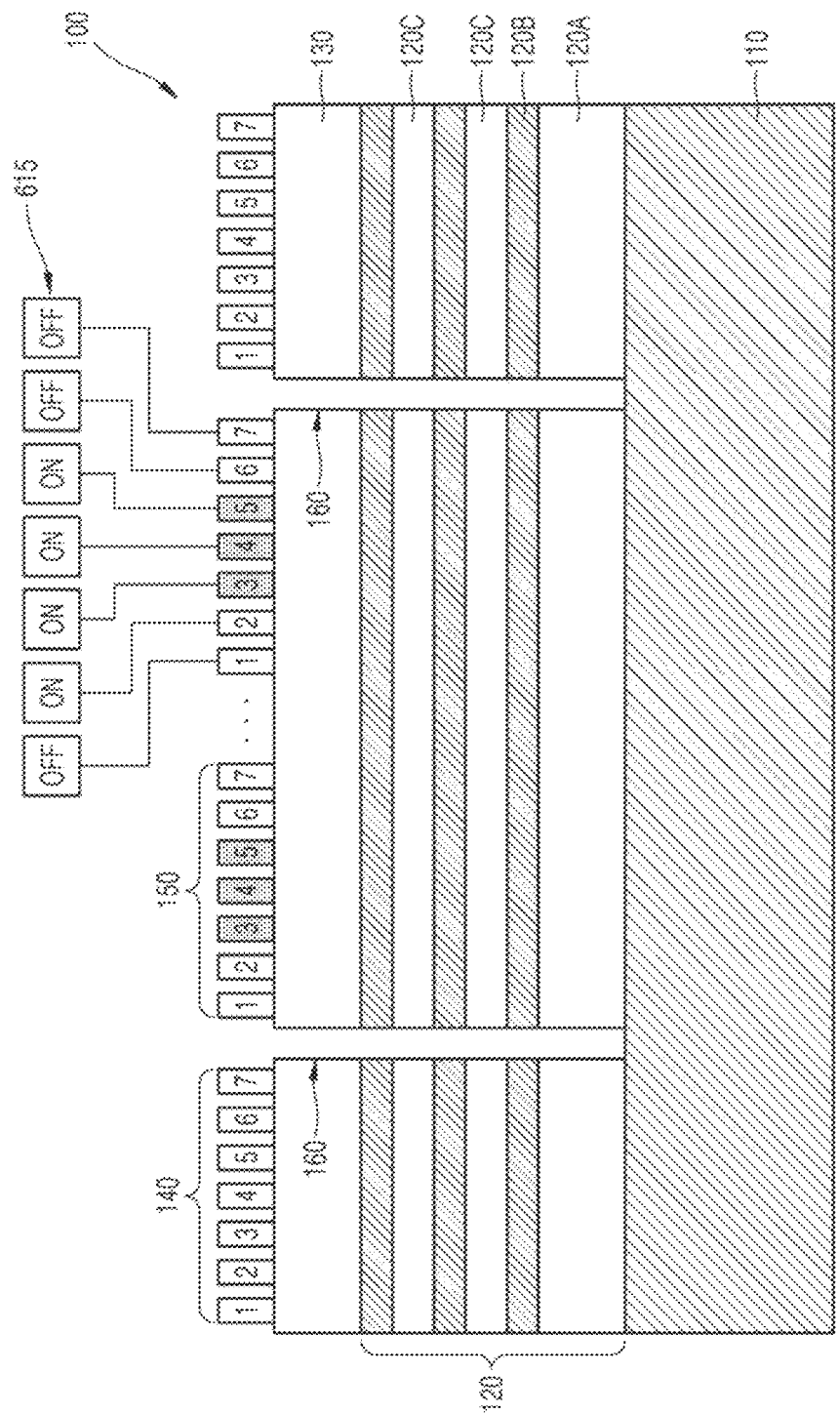
FIG. 6 is a cross-sectional view illustrating a first driving method of a spatial light modulator according to an example embodiment.

FIG. 6 shows a first driving method of a spatial light modulator according to an example embodiment. The first driving method may be a driving method for the first spatial light modulator 100.

In the first driving method of FIG. 6, the first pixel 140 is regarded as a non-driving pixel, and the second pixel 150 is regarded as a driving pixel. The same will be applied to the following driving methods.

Referring to FIG. 6, a current is applied only to some HCGs of the first to seventh HCG 1 to 7 included in the second pixel 150 and does not apply a current to the remaining HCGs. For example, a current is applied only to the third to fifth HCGs 3, 4, and 5, and no current is applied to the first and second HCGs 1 and 2 and the sixth and seventh HCGs 6 and 7 arranged at edges. In one example, a current of about 7 mA may be applied to the third to fifth HCGs 3, 4, and 5, but is not limited thereto.

The application of the current may be controlled by a current controller 615 connected to each of the first to seventh HCGs 1 to 7 included in the second pixel 150. For example, the current controller 615 connected to the third to fifth HCGs 1 to 7 may be an ON state, and the current controller 615 connected to the first and second HCGs 1 and 2 and the sixth and seventh HCGs 6 and 7 may be an OFF state. Although the current controller 615 may be individually connected to all of the first and second pixels 140 and 150, for convenience of illustration, it is depicted that the current controller 615 is connected to only one driving pixel.

In this way, in the HCGs 1 to 7 included in the driving pixel 150, no current is applied to the outer HCGs, but only the HCGs in an inner region is applied, and in addition, because the trench 160 exists between the driving pixel 150 and the non-driving pixel 140, the transfer of heat generated in the driving pixel 150 to the adjacent non-driving pixel 140 may be minimized or blocked.

Figure 7:
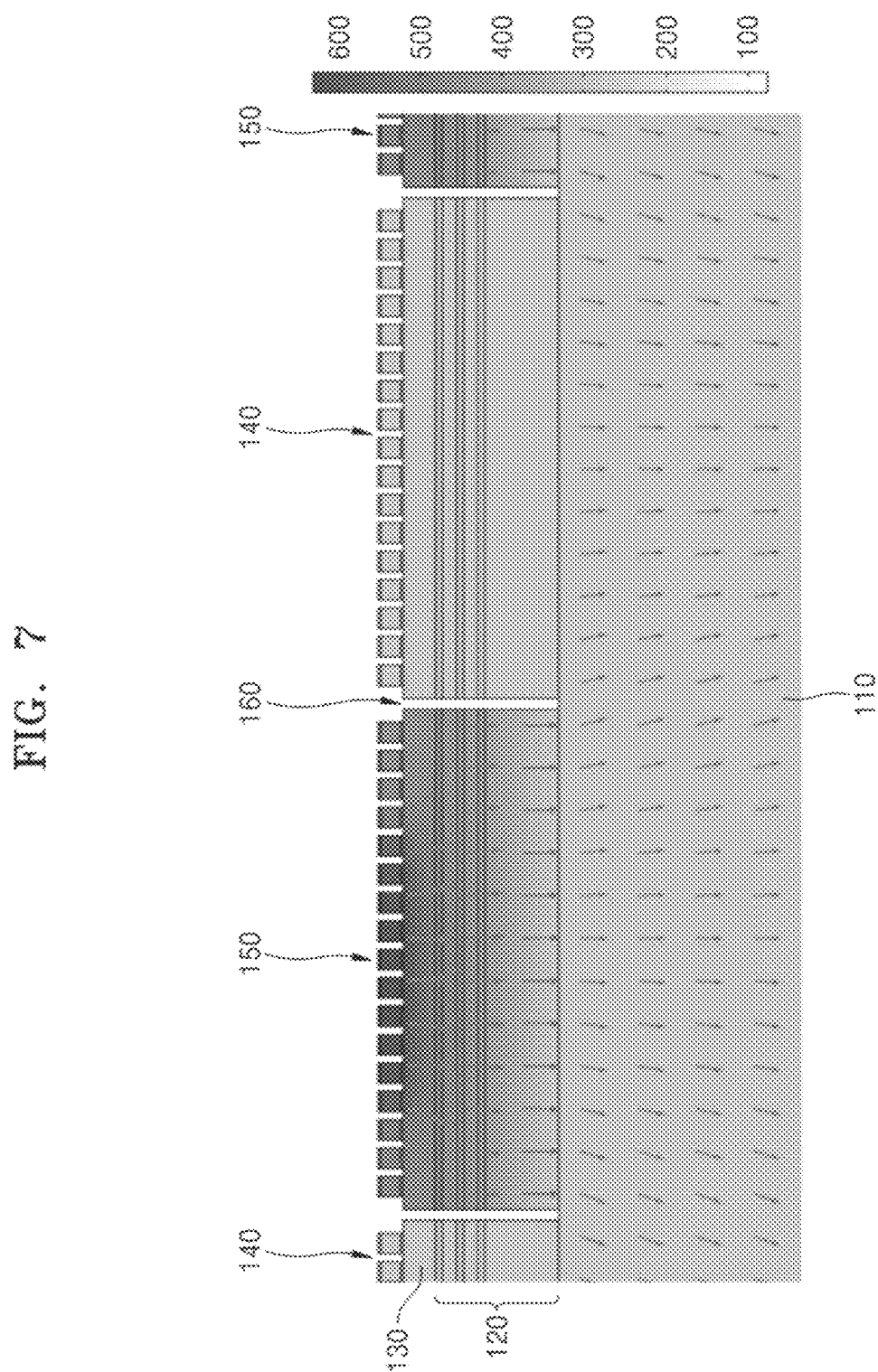
FIG. 7 is a cross-sectional view illustrating simulation results for the transmission of heat generated in a driving pixel of the spatial light modulator according to the first driving method of FIG. 6.

This fact may be confirmed from simulation results for heat generation and transfer according to the driving of the first spatial light modulator 100 shown in FIG. 7.

In the case of the first spatial light modulator 100 used to obtain the simulation results of FIG. 7, each pixel includes 18 HCGs, one HCG at the edge is removed, and a trench 160 is formed in the place from which the one HCG is removed. As a result, each pixel was set to include 17 HCGs. Each HCG was set to be crystalline silicon HCG. In addition, the width W1 and height H1 of each HCG were set to 450 nm, the period P1 was set to 560 nm, the cavity layer 130 was a $SiO_2$ layer and the thickness of the cavity layer 130 was set to 573 nm. In addition, the DBR layer 120 was set such that the first layer 120A and the second layer 120B were alternately stacked three times, the second layer 120B was a 118 nm thick silicon layer and the first layer 120A was a 265 nm thick $SiO_2$ layer, and the thickness T1 of the lowermost first layer 120A was 5 times the thickness T3 of the first layer 120A that is not present at the bottom. The substrate 110 was a silicon substrate. In addition, a current was applied to the plurality of first and second pixels 140 and 150 in a binary driving method. For example, the plurality of first and second pixels 140 and 150 are aligned in one direction (1D alignment), and are alternately and repeatedly aligned. In this arrangement, by selecting the first pixel 140 as a non-driving pixel and the second pixel 150 as a driving pixel, the pixel layer PL is driven in which on/off is alternately repeated.

In addition, in relation to the application of current to the second pixel 150, in the 17 HCGs included in the second pixel 150, no current was applied to some HCGs adjacent to the first pixel 140, and a current was applied only to the remaining HCGs. For example, in the 17 HCGs set to be included in the second pixel 150, a current is not applied to the four HCGs adjacent to the first pixel 140 on a left side of the second pixel 150 and the three HCGs adjacent to the first pixel 140 on a right side of the second pixel 150, but a current is applied to only the remaining 10 HCGs.

FIG. 7 illustrates that the driving pixel 150 maintains a relatively high temperature and the non-driving pixel 140 maintains a relatively low temperature. As indicated by arrows, Joule heat generated in the driving pixel 150 moves to a lower end of the corresponding driving pixel 150 and is transferred to a lower end of the substrate 110 through the substrate 110, and is not transmitted to the non-driving pixel 140 due to the trench 160.

The result of FIG. 7 suggests that there is no heat leakage from the driving pixel 150.

In FIG. 7, the length of the arrows represents a logarithm value of an amount of heat flow.

Figure 8:
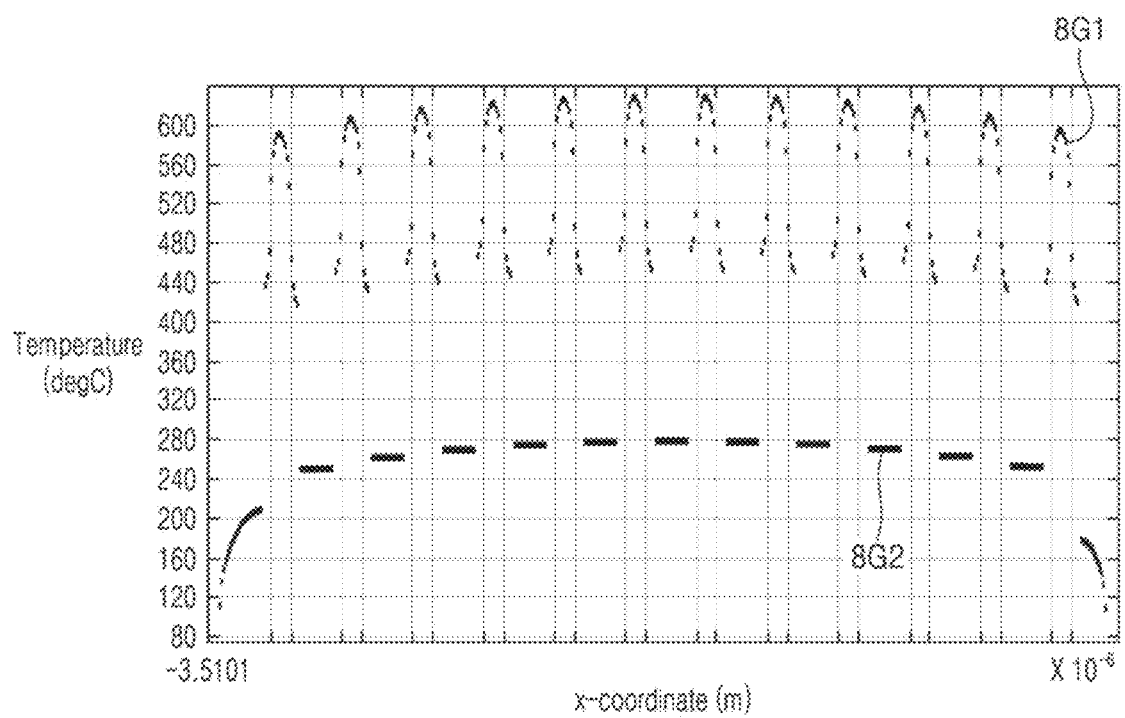
FIG. 8 is a graph showing a temperature distribution of a driving pixel and a non-driving pixel of the spatial light modulator according to the first driving method of FIG. 6.

FIG. 8 shows a temperature distribution of a driving pixel and a non-driving pixel in the first driving method.

In FIG. 8, the horizontal axis indicates position, and the vertical axis indicates temperature.

In FIG. 8, a plurality of first graphs 8G1 indicate a temperature distribution for the driving pixel 150, and a second graph 8G2 indicates a temperature distribution for the non-driving pixel 140, respectively. Each of the plurality of first graphs 8G1 represents one driving pixel, and each of points constituting one graph 8G1 represents an HCG included in one driving pixel. In addition, each node constituting the second graph 8G2 represents one non-driving pixel.

Referring to the first and second graphs 8G1 and 8G2 of FIG. 8, driving pixels are distributed at a range from about 420° C. to about 630° C., and non-driving pixels are distributed at about 280° C. or less. Accordingly, a maximum temperature difference between the adjacent driving pixels and the non-driving pixel is about 350° C.

Figure 9:
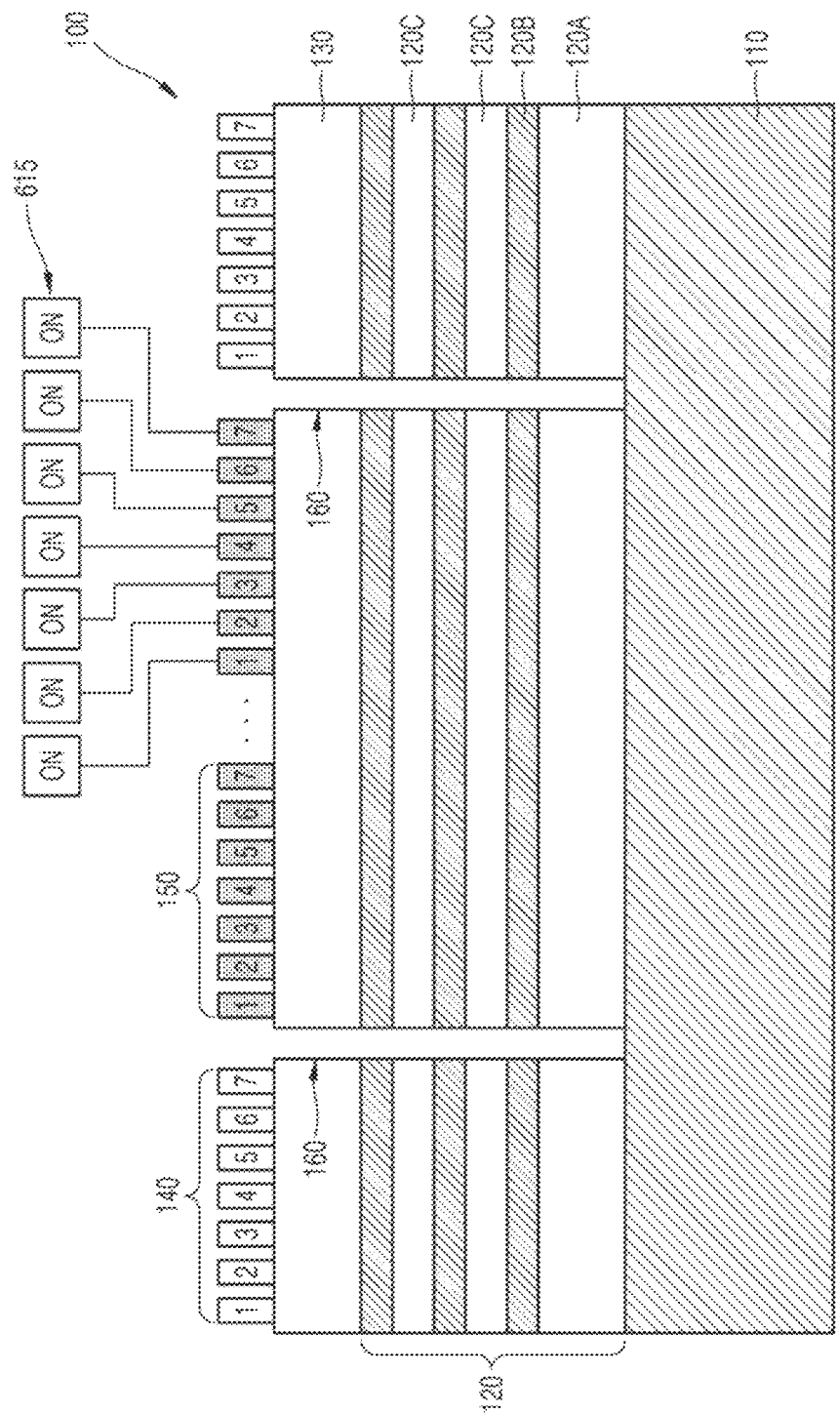
FIG. 9 is a cross-sectional view illustrating a second driving method of a spatial light modulator according to an example embodiment.

FIG. 9 shows a second driving method of a spatial light modulator according to an example embodiment. The second driving method may be another driving method for the first spatial light modulator 100. Only parts different from the first driving method will be described.

Referring to FIG. 9, a current is applied to all of the first to seventh HCGs 1 to 7 included in the second pixel 150. At this time, all of the current controllers 615 are in a turned-on state. A current is applied to all of the HCGs 1-7 included in the second pixel 150, and in this case, a temperature distribution of the second pixel 150 may be uniform as a whole.

Even when a current is applied to the second pixel 150, that is, all the HCGs 1-7 included in the driving pixel 150, due to the trench 160 formed between the driving pixel 150 and the non-driving pixel 140, heat transfer from the driving pixel 150 to the non-driving pixel 140 may be minimized or blocked.

Figure 10:
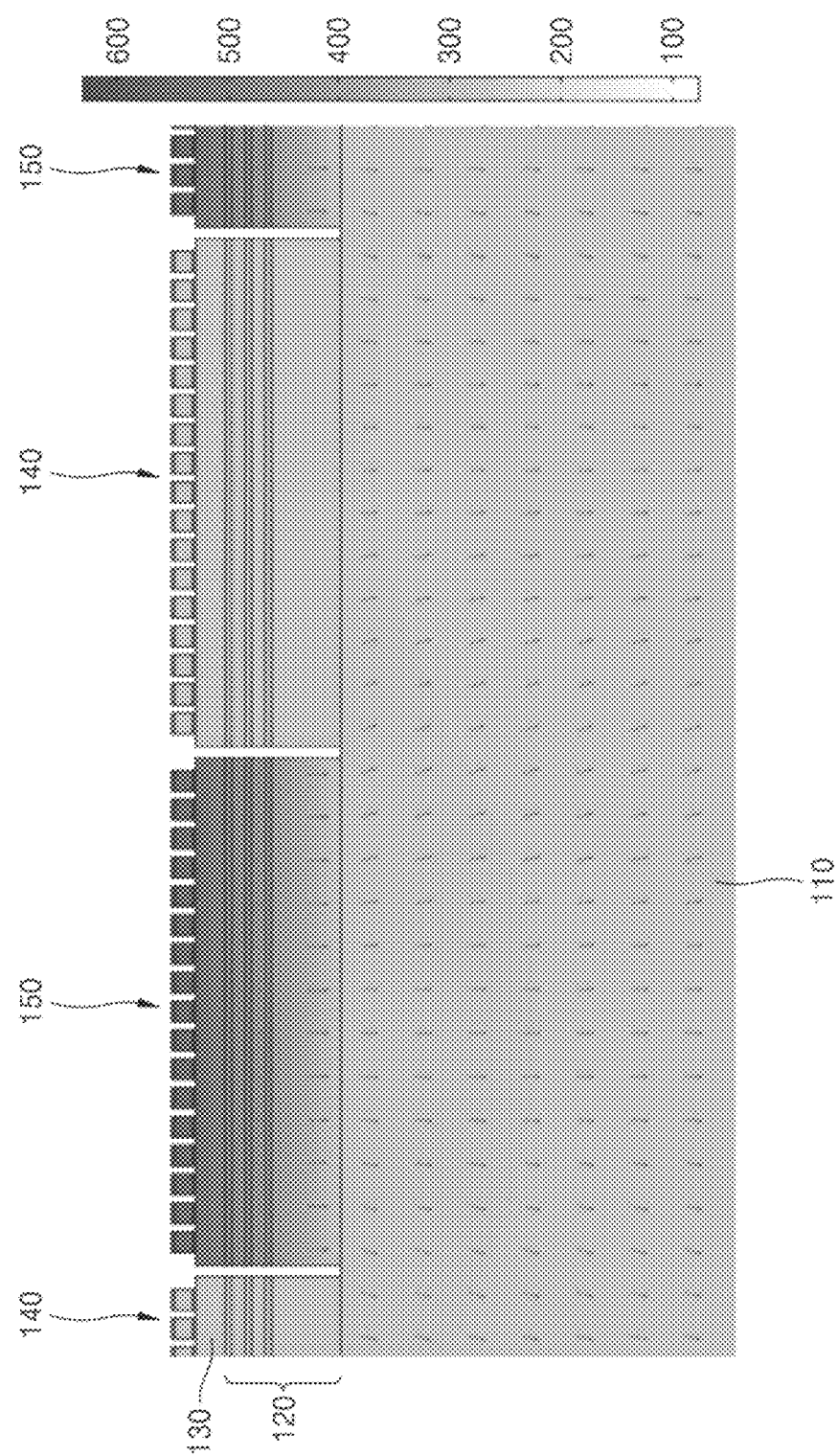
FIG. 10 is a cross-sectional view illustrating simulation results for the transmission of heat generated in a driving pixel of the spatial light modulator according to the second driving method of FIG. 9.

This may be confirmed from simulation results for heat generation and transfer according to the driving of the first spatial light modulator 100 shown in FIG. 10.

The settings for the first spatial light modulator 100 used to obtain the simulation results of FIG. 10 may be the same as those settings described with reference to FIG. 7.

Referring to FIG. 10, it may be confirmed that the driving pixel 150 maintains a relatively high temperature and the non-driving pixel 140 maintains a relatively low temperature. As indicated by arrows, Joule heat generated in the driving pixel 150 moves to a lower end of the corresponding driving pixel 150 and is transferred to a lower end of the substrate 110 through the substrate 110, and is not transmitted to the non-driving pixel 140.

This result of FIG. 10 suggests that there is no heat leakage from the driving pixel 150.

Figure 11:
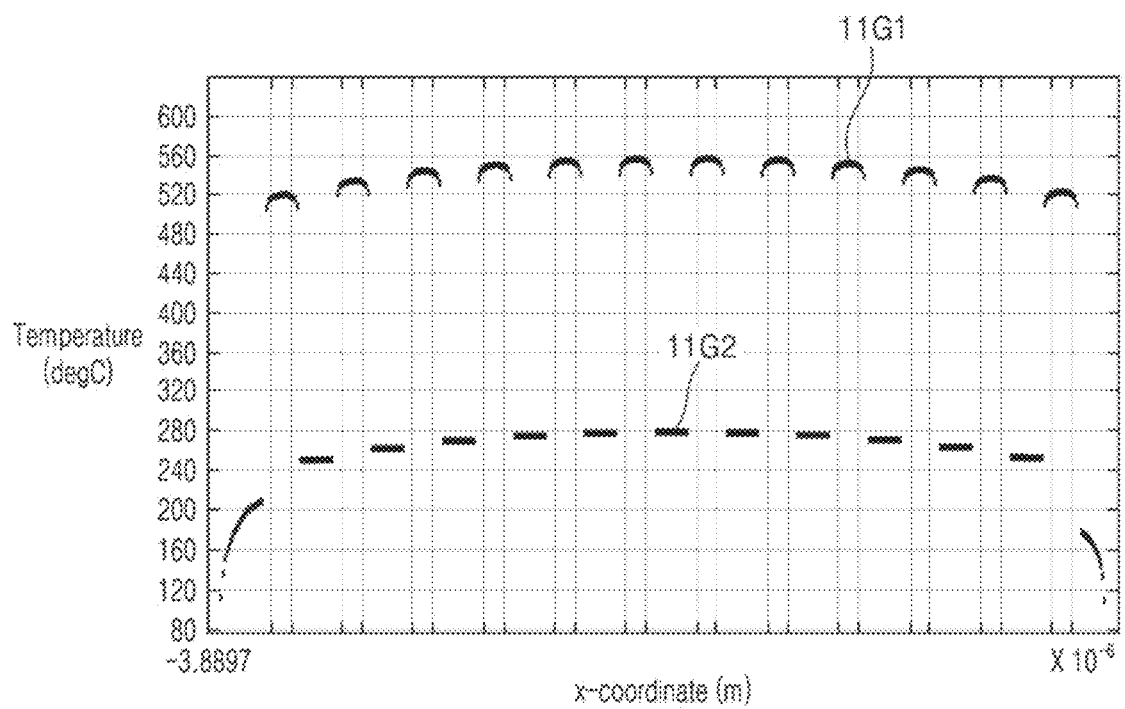
FIG. 11 is a graph showing a temperature distribution of a driving pixel and a non-driving pixel of the spatial light modulator according to the second driving method of FIG. 9.

FIG. 11 shows a temperature distribution of a driving pixel and a non-driving pixel in the second driving method.

In FIG. 11, the horizontal axis indicates position, and the vertical axis indicates temperature.

In FIG. 11, a first graph 11G1 shows a temperature distribution for the driving pixel, and a second graph 11G2 shows a temperature distribution for the non-driving pixel, respectively. Each of convex nodes constituting the first graph 11G1 represents one driving pixel. In addition, each node constituting the second graph 11G2 represents one non-driving pixel.

Comparing the first graph 11G1 of FIG. 11 and the first graph 8G1 of FIG. 8, in the case of the second driving method, a temperature difference between the HCGs included in each driving pixel is not large, and accordingly, in the second driving method, it may be seen that a temperature distribution of each driving pixel is uniform as a whole.

Referring to the first and second graphs 11G1 and 11G2 of FIG. 11, the driving pixels are distributed at a temperature range of about 510° C. to about 558° C., and the non-driving pixels are distributed at 280° C. or less. Accordingly, a maximum temperature difference between the adjacent driving pixel and the non-driving pixel is about 278° C.

Figure 12:
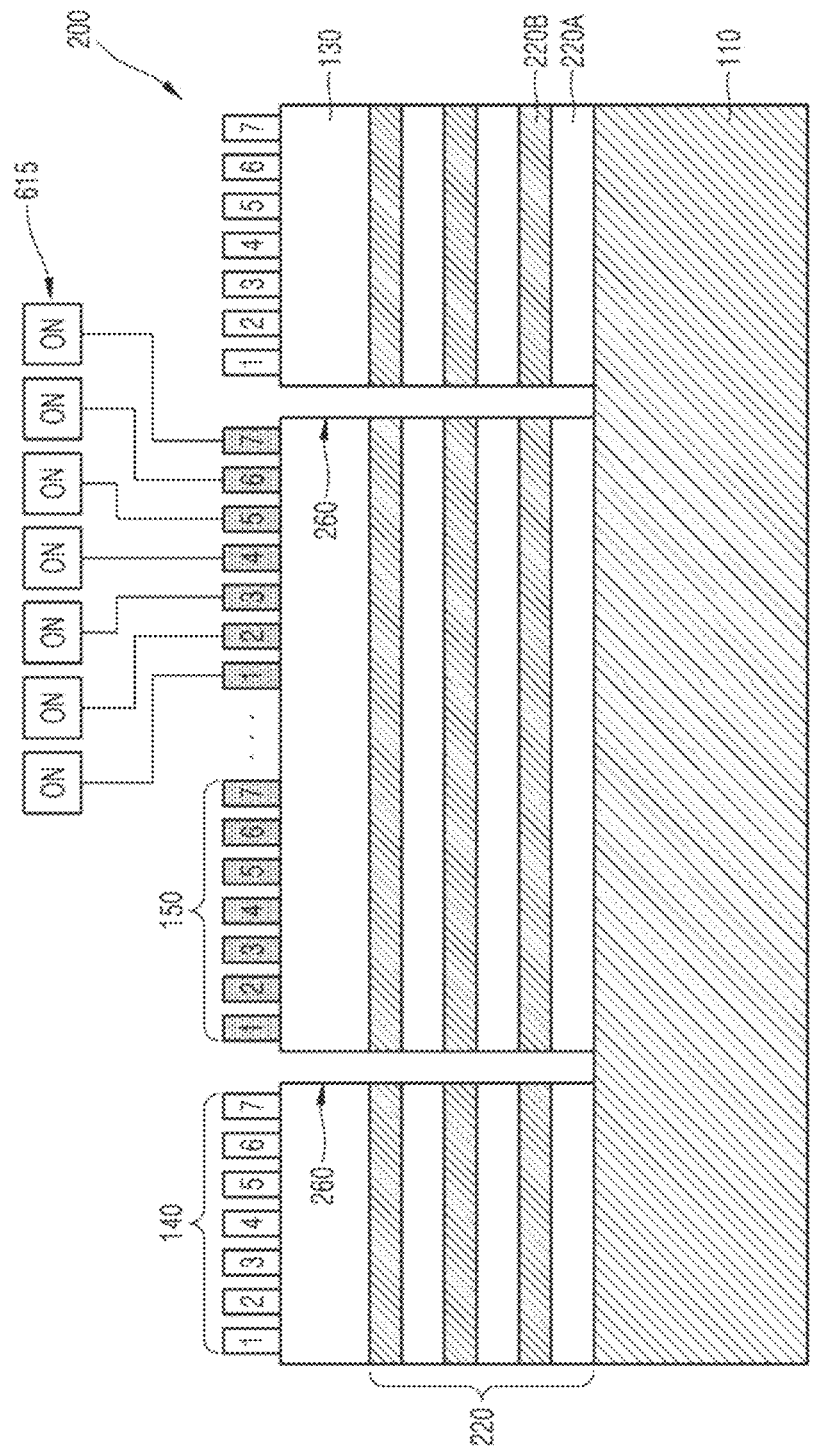
FIG. 12 is a cross-sectional view illustrating a third driving method of a spatial light modulator according to an example embodiment.

FIG. 12 shows a third driving method of a spatial light modulator according to an example embodiment. The third driving method may be a driving method for the second spatial light modulator 200.

As shown in FIG. 12, the third driving method is a method of applying a current to the entire HCGs 1 to 7 included in the second pixel 150 which is a driving pixel, and the driving method itself may be the same as the second driving method.

In the third driving method, heat transfer from the driving pixel 150 to the non-driving pixel 140 may be minimized or blocked due to the trench 160 formed between the driving pixel 150 and the non-driving pixel 140.

Figure 13:
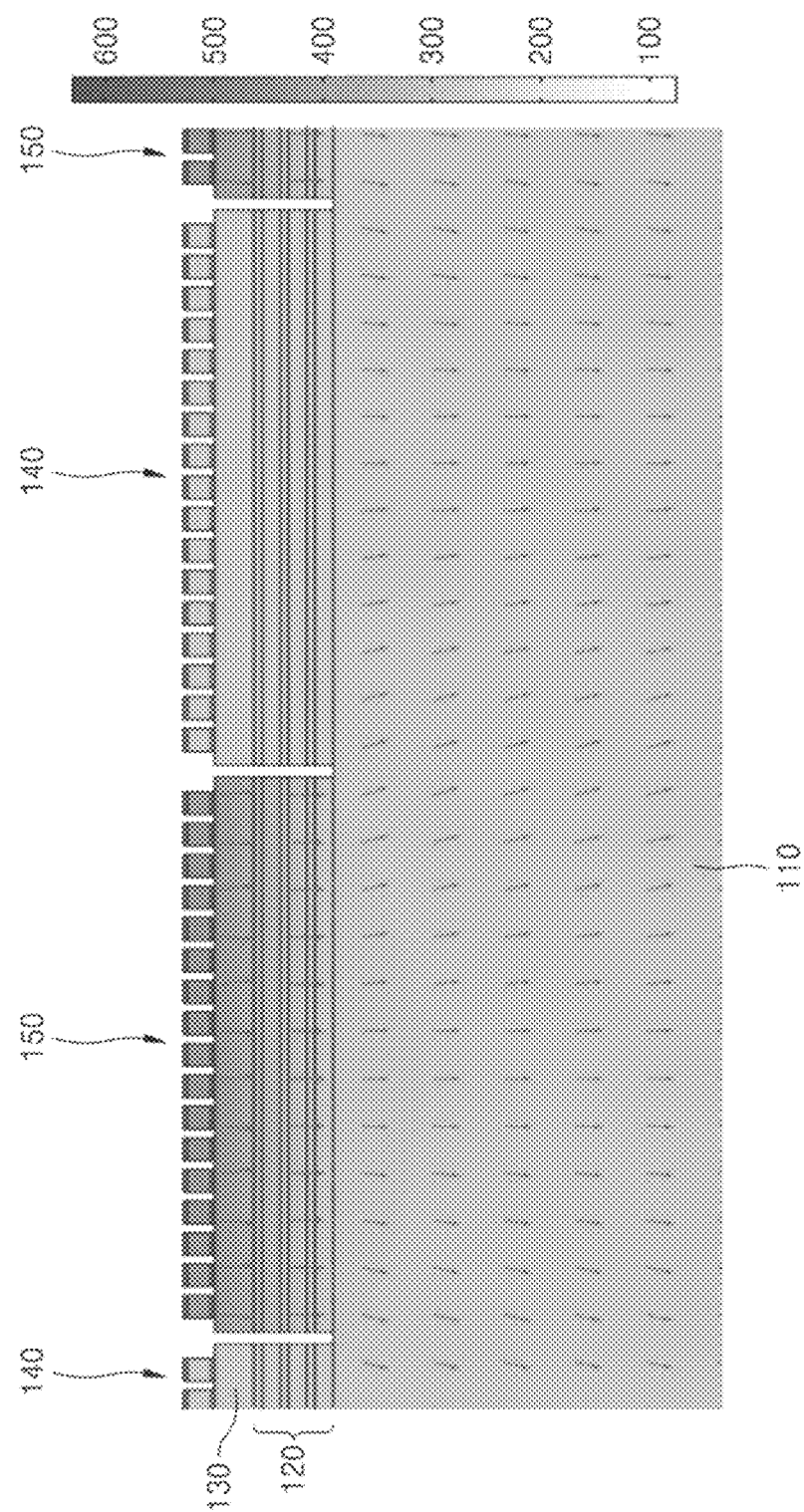
FIG. 13 is a cross-sectional view illustrating simulation results for the transmission of heat generated in a driving pixel of a spatial light modulator according to the third driving method of FIG. 12.

This may be confirmed from simulation results for heat generation and transfer according to the driving of the second spatial light modulator 200 shown in FIG. 13.

The settings for the second spatial light modulator 200 used to obtain the simulation results of FIG. 13 may be the same as those settings described with reference to FIG. 7 except that the thickness of all of the first layers 220A included in the DBR layer 220 of the second spatial light modulator 200 is the same or substantially the same.

Referring to FIG. 13, it may be confirmed that the driving pixel 150 maintains a relatively high temperature and the non-driving pixel 140 maintains a relatively low temperature. As indicated by arrows, Joule heat generated in the driving pixel 150 moves to a lower end of the corresponding driving pixel 150 and is transferred to a lower end of the substrate 110 through the substrate 110, and is not transmitted to the non-driving pixel 140.

This result of FIG. 13 suggests that there is no heat leakage from the driving pixel 150.

Figure 14:
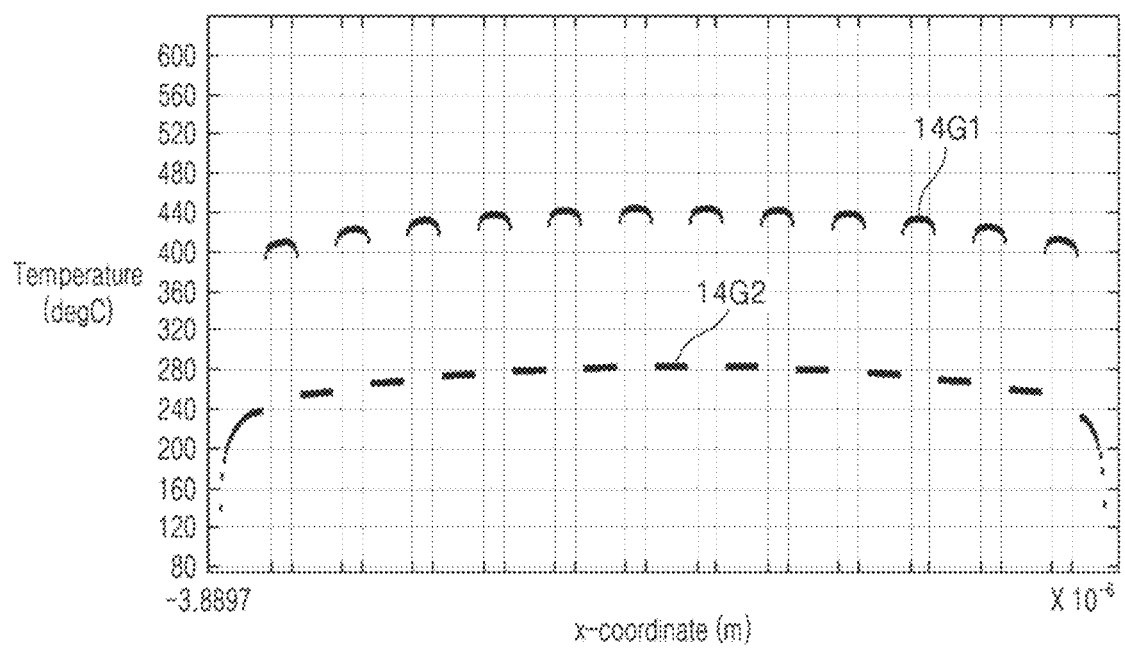
FIG. 14 is a graph showing a temperature distribution of a driving pixel and a non-driving pixel of the spatial light modulator according to the third driving method of FIG. 12.

FIG. 14 shows a temperature distribution of a driving pixel and a non-driving pixel in the third driving method.

In FIG. 14, the horizontal axis indicates position, and the vertical axis indicates temperature.

In FIG. 14, a first graph 14G1 shows a temperature distribution for the driving pixel, and a second graph 14G2 indicates a temperature distribution for the non-driving pixel, respectively. Each of convex nodes constituting the first graph 14G1 represents one driving pixel. In addition, each node constituting the second graph 14G2 represents one non-driving pixel.

The shape of each node of the first graph 14G1 of FIG. 14 is similar to the shape of each node of the first graph 11G1 of FIG. 11. This suggests that, in the third driving method as in the second driving method, a temperature difference between the HCGs included in each driving pixel is not large and the temperature distribution of each driving pixel is uniform as a whole.

Referring to the first and second graphs 14G1 and 14G2 of FIG. 14, a temperature difference between the adjacent driving pixel and the non-driving pixel is about 165° C.

When the second spatial light modulator 200 is driven according to the third driving method, a process is relatively easy, and a uniform temperature distribution may be obtained in the driving pixel 150.

Figure 15:
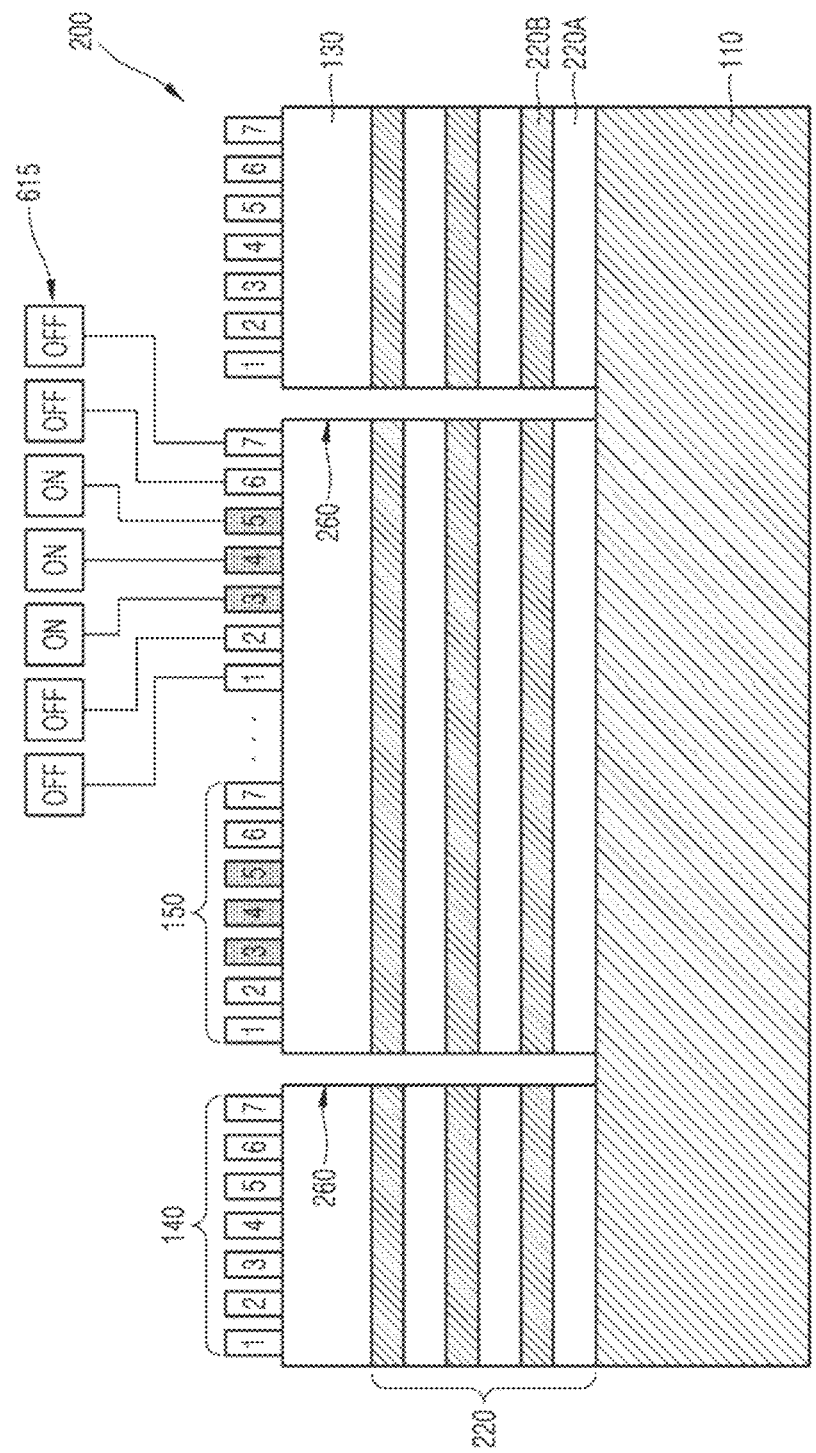
FIG. 15 is a cross-sectional view showing a fourth driving method of a spatial light modulator according to an example embodiment.

FIG. 15 shows a fourth driving method of a spatial light modulator according to an example embodiment. The fourth driving method may be another driving method for the second spatial light modulator 200.

As shown in FIG. 15, the fourth driving method is a method of applying a current to only a part of the HCGs 1 to 7 included in the second pixel 150 which is a driving pixel, and the driving method itself may be the same as the first driving method.

In the fourth driving method, heat transfer from the driving pixel 150 to the non-driving pixel 140 may be minimized or blocked due to the trench 160 formed between the driving pixel 150 and the non-driving pixel 140.

Figure 16:
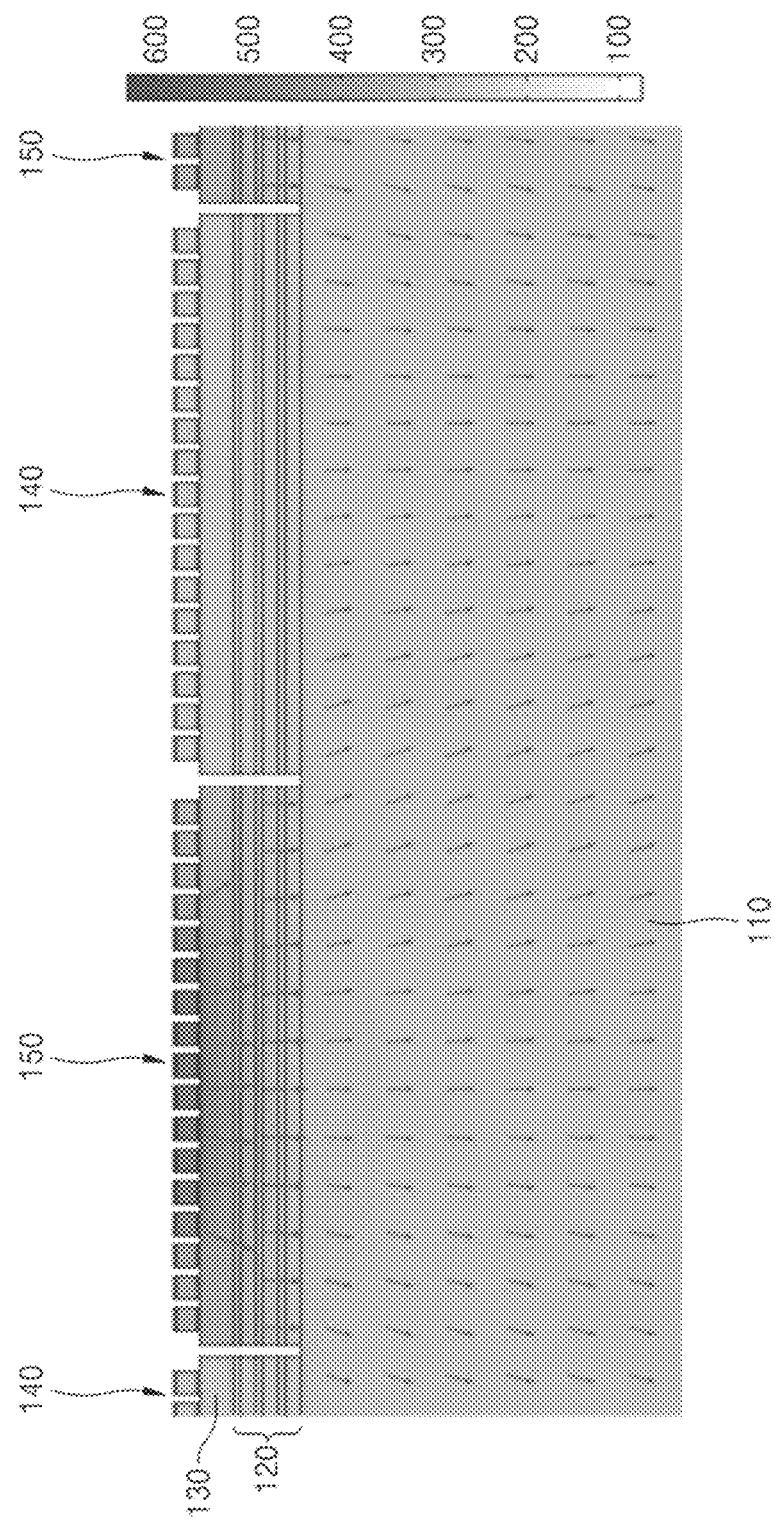
FIG. 16 is a cross-sectional view showing simulation results for the transmission of heat generated in a driving pixel of the spatial light modulator according to the fourth driving method of FIG. 15.

This may be confirmed from simulation results of heat generation and transfer according to the driving of the second spatial light modulator 200 shown in FIG. 16.

The settings for the second spatial light modulator 200 used to obtain the simulation results of FIG. 16 may be the same as those settings described with reference to FIG. 7 except that the thickness of all of the first layers 220A included in the DBR layer 220 of the second spatial light modulator 200 is the same or substantially the same.

FIG. 16 illustrates that the temperature is the highest in a central region of the driving pixel 150, the temperature decreases toward the edges, and the non-driving pixel 140 maintains a relatively low temperature. As indicated by arrows, Joule heat generated in the driving pixel 150 moves to a lower end of the corresponding driving pixel 150 and is transferred to a lower end of the substrate 110 through the substrate 110, and is not transmitted to the non-driving pixel 140.

This result of FIG. 16 suggests that there is no heat leakage from the driving pixel 150.

Figure 17:
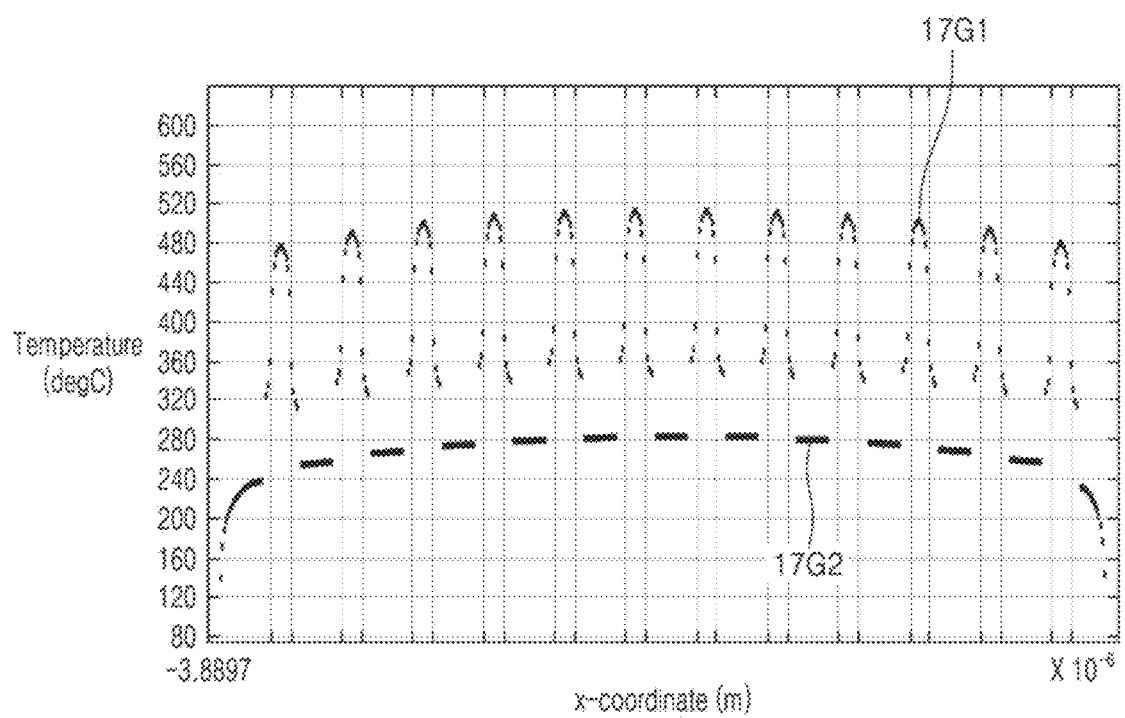
FIG. 17 is a graph showing a temperature distribution of a driving pixel and a non-driving pixel of the spatial light modulator according to the fourth driving method of FIG. 15.

FIG. 17 shows a temperature distribution of a driving pixel and a non-driving pixel in the fourth driving method.

In FIG. 17, the horizontal axis indicates position, and the vertical axis indicates temperature.

In FIG. 17, a first graph 17G1 indicates a temperature distribution for the driving pixel, and a second graph 17G2 indicates a temperature distribution for the non-driving pixel, respectively.

Each of the plurality of first graphs 17G1 represents one driving pixel, and points constituting the one graph 17G1 each indicate an HCG included in the one driving pixel. In addition, each node constituting the second graph 17G2 represents one non-driving pixel.

Referring to the first and second graphs 17G1 and 17G2 of FIG. 17, a temperature difference between adjacent driving pixel and the non-driving pixel is about 228° C.

When the second spatial light modulator 200 is driven according to the fourth driving method, a process is relatively easy, and a relatively high temperature difference may be obtained between the driving pixel 150 and the non-driving pixel 140 compared to the third driving method.

Figure 18:
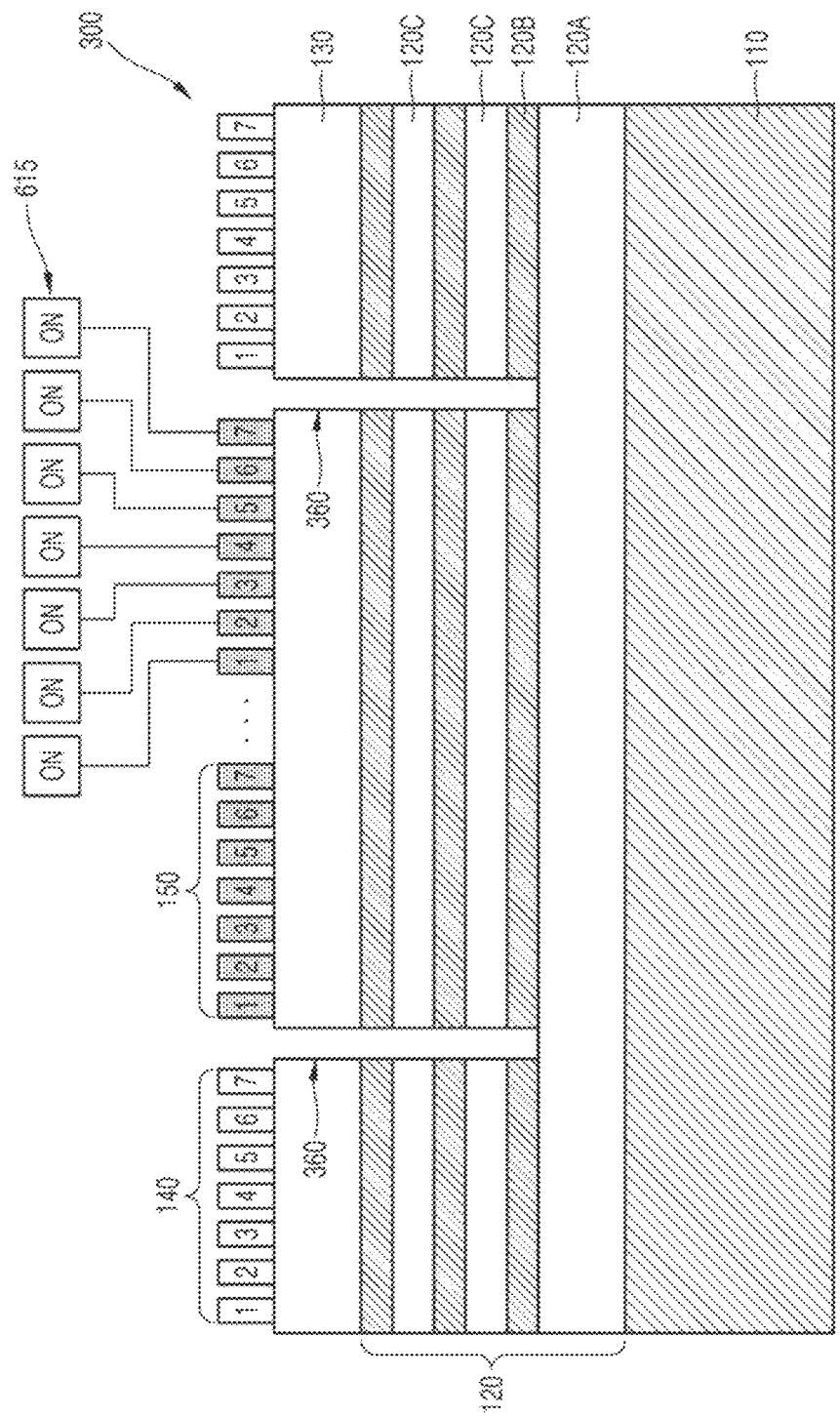
FIG. 18 is a cross-sectional view showing a fifth driving method of a spatial light modulator according to an example embodiment.

FIG. 18 shows a fifth driving method of a spatial light modulator according to an example embodiment. The fifth driving method may be a driving method for the third spatial light modulator 300.

As shown in FIG. 18, the fifth driving method is a method of applying a current to the entire HCGs 1 to 7 included in the second pixel 150 which is a driving pixel, and the fifth driving method itself may be the same as the second driving method or the third driving method.

Even in the fifth driving method, heat transfer from the driving pixel 150 to the non-driving pixel 140 may be minimized or blocked due to the trench 160 formed between the driving pixel 150 and the non-driving pixel 140.

Figure 19:
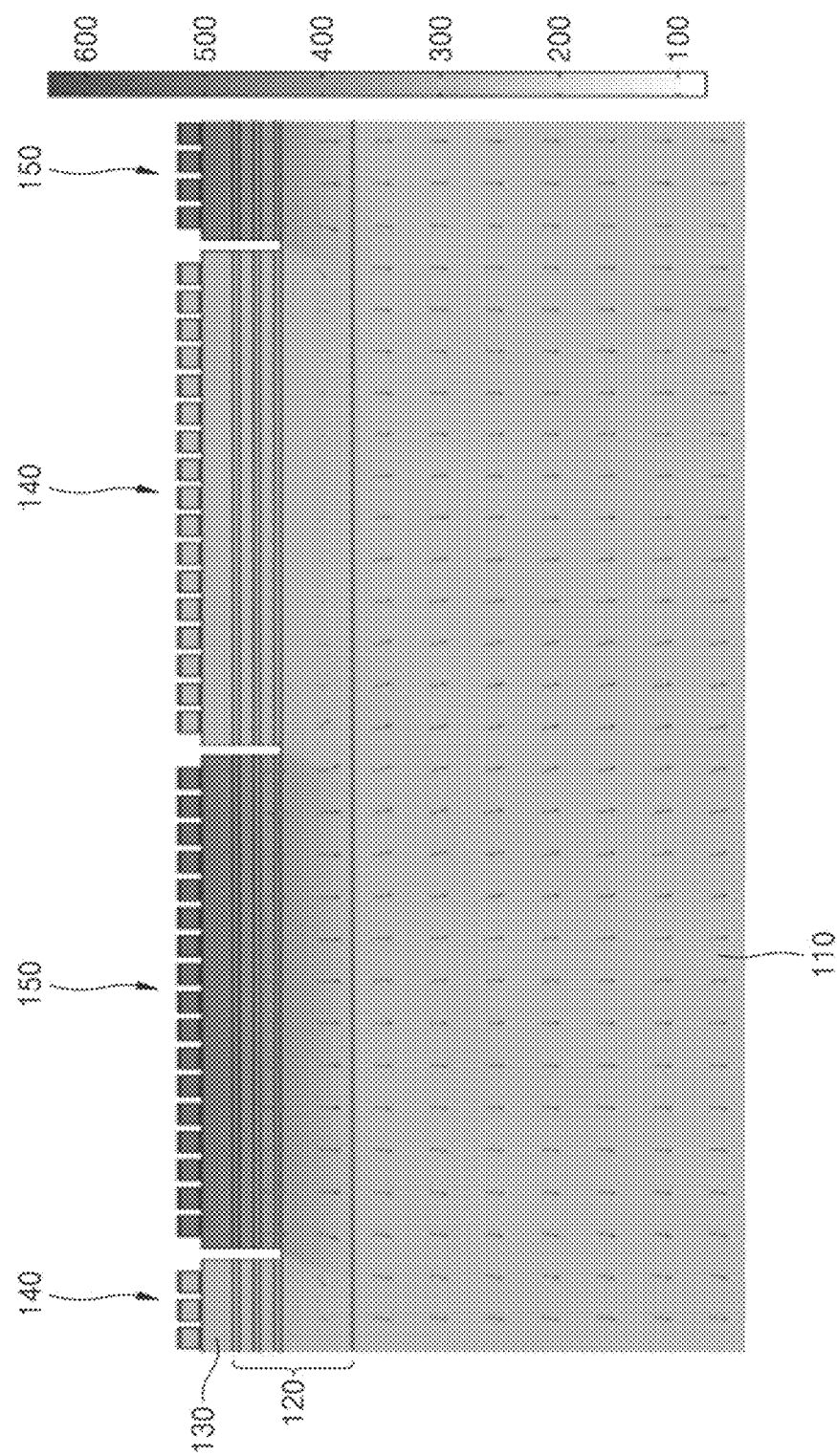
FIG. 19 is a cross-sectional view illustrating simulation results for the transmission of heat generated in a driving pixel of a spatial light modulator according to the fifth driving method of FIG. 18.

This may be confirmed from simulation results of heat generation and transfer according to the driving of the third spatial light modulator 300 shown in FIG. 19.

The settings for the third spatial light modulator 300 used to obtain the simulation results of FIG. 19 may be the same as those settings described with reference to FIG. 7 except that the trench 360 does not penetrate through the lowermost first layer 120A of the DBR layer 120.

FIG. 19 illustrates that the driving pixel 150 maintains a relatively high temperature and the non-driving pixel 140 maintains a relatively low temperature. As indicated by arrows, Joule heat generated in the driving pixel 150 moves to a lower end of the corresponding driving pixel 150 and is transferred to a lower end of the substrate 110 through the substrate 110, and is not transmitted to the non-driving pixel 140.

This result of FIG. 19 suggests that there is no heat leakage from the driving pixel 150.

Figure 20:
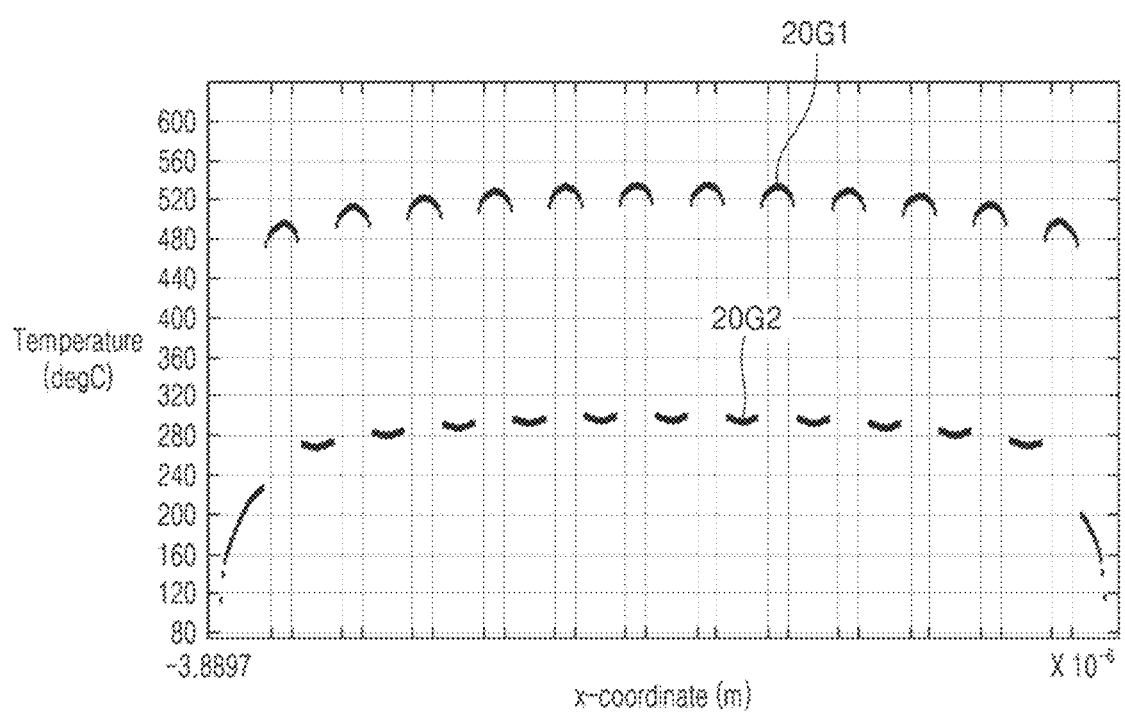
FIG. 20 is a graph showing a temperature distribution of a driving pixel and a non-driving pixel of the spatial light modulator according to the fifth driving method of FIG. 18.

FIG. 20 shows a temperature distribution of a driving pixel and a non-driving pixel in the fifth driving method.

In FIG. 20, the horizontal axis indicates position, and the vertical axis indicates temperature.

In FIG. 20, a first graph 20G1 shows a temperature distribution for the driving pixel, and a second graph 20G2 shows a temperature distribution for the non-driving pixel, respectively. Each convex node constituting the first graph 20G1 represents one driving pixel. In addition, each node constituting the second graph 20G2 represents one non-driving pixel.

The shape of each node that is slightly convex above the first graph 20G1 of FIG. 20 is similar to the shape of each node of the first graph 11G1 of FIG. 11 or the first graph 14G1 of FIG. 14. This suggests that, in the fifth driving method likewise in the second driving method and the third driving method, the temperature difference between the HCGs included in each driving pixel is not large and the temperature distribution of each driving pixel is uniform as a whole.

Referring to the first and second graphs 20G1 and 20G2 of FIG. 20, the temperature difference between the adjacent driving pixel and the non-driving pixel is about 238° C. When the third spatial light modulator 300 is driven according to the fifth driving method, a process is relatively easy and a uniform temperature distribution may be obtained in the driving pixel 150.

Figure 21:
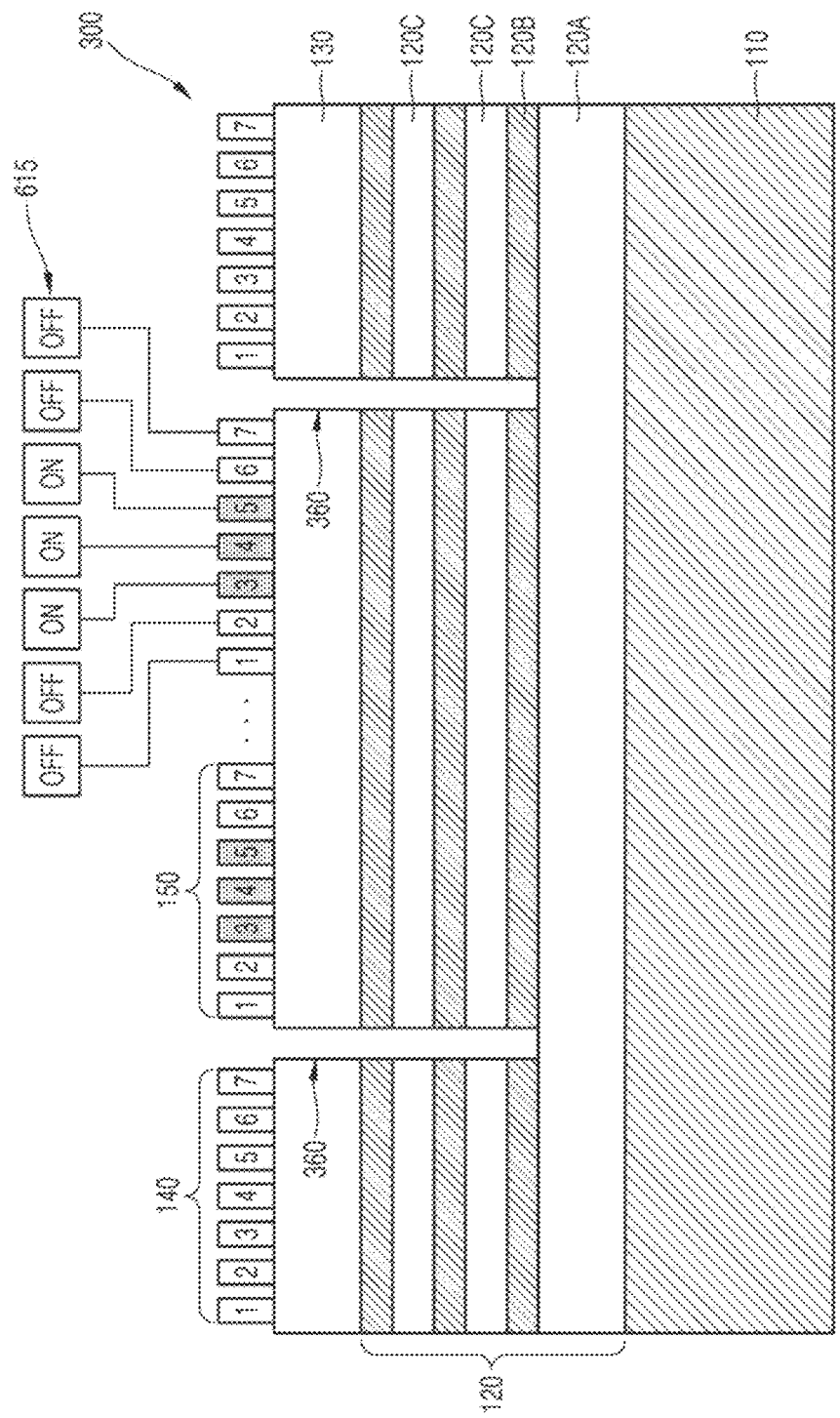
FIG. 21 is a cross-sectional view showing a sixth driving method of a spatial light modulator according to an example embodiment.

FIG. 21 shows a sixth driving method of a spatial light modulator according to an example embodiment. The sixth driving method may be another driving method for the third spatial light modulator 300.

As shown in FIG. 21, the sixth driving method is a method of applying a current only to the HCGs 3 to 5 in a central region among the HCGs 1 to 7 included in the second pixel 150 which is a driving pixel, and the driving method itself may be the same as the first driving method.

In addition, in the sixth driving method, due to the trench 160 formed between the driving pixel 150 and the non-driving pixel 140 and because no current is applied to the HCGs 1, 2, 6, and 7 adjacent to the non-driving pixel 140 of the driving pixel 150, the transfer of heat from the driving pixel 150 to the non-driving pixel 140 may be minimized or blocked.

Figure 22:
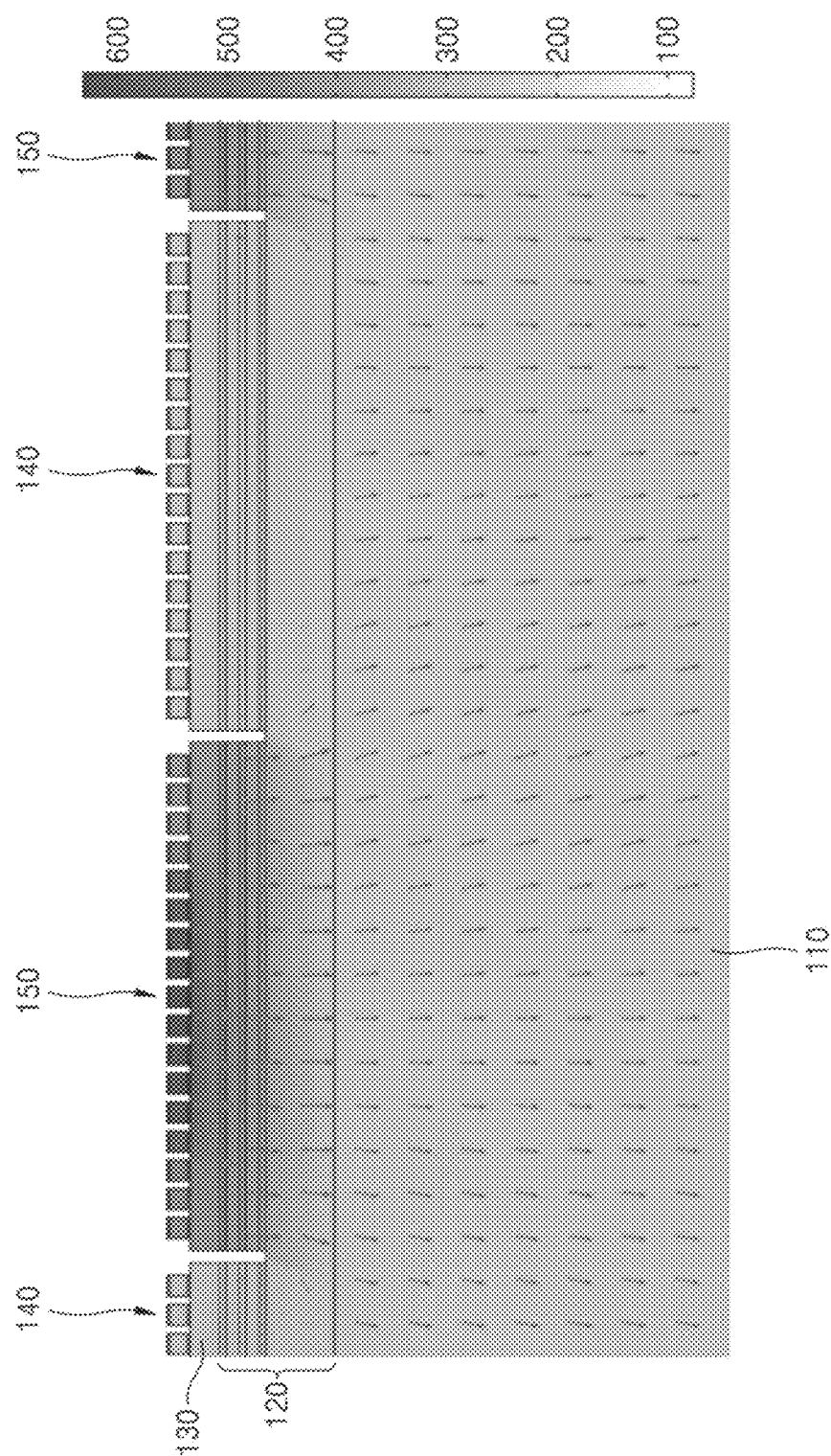
FIG. 22 is a cross-sectional view illustrating simulation results for the transmission of heat generated in a driving pixel of a spatial light modulator according to the sixth driving method of FIG. 21.

This may be confirmed from simulation results of heat generation and transfer according to the driving of the third spatial light modulator 300 shown in FIG. 22.

The settings for the third spatial light modulator 300 used to obtain the simulation results of FIG. 22 may be the same as the settings for the fifth driving method.

FIG. 22 illustrates that the temperature is the highest in the central region of the driving pixel 150, the temperature decreases toward the edges, and the non-driving pixel 140 maintains a relatively low temperature. As indicated by arrows, Joule heat generated in the driving pixel 150 moves to a lower end of the corresponding driving pixel 150 and is transferred to a lower end of the substrate 110 through the substrate 110, and is not transmitted to the non-driving pixel 140.

As a result, FIG. 22 suggests that there is no heat leakage from the driving pixel 150 in the sixth driving method.

Figure 23:
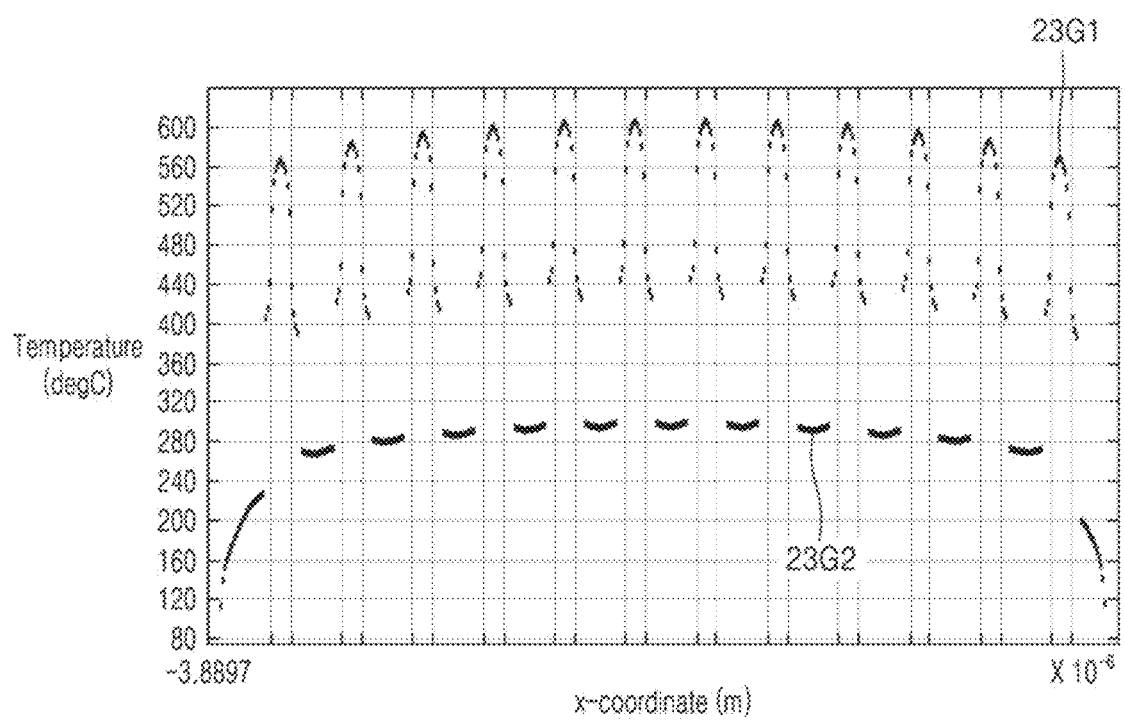
FIG. 23 is a graph showing a temperature distribution of a driving pixel and a non-driving pixel of the spatial light modulator according to the sixth driving method of FIG. 21.

FIG. 23 shows a temperature distribution of a driving pixel and a non-driving pixel in the sixth driving method.

In FIG. 23, the horizontal axis indicates position, and the vertical axis indicates temperature.

In FIG. 23, first graphs 23G1 show temperature distributions for driving pixels, and a second graph 23G2 shows a temperature distribution for a non-driving pixel, respectively.

Each of the plurality of first graphs 23G1 represents one driving pixel, and points constituting the one graph 23G1 each indicate an HCG included in one driving pixel. In addition, each node constituting the second graph 23G2 represents one non-driving pixel.

Referring to the first and second graphs 23G1 and 23G2 of FIG. 23, a maximum temperature difference between the adjacent driving pixel and the non-driving pixel is about 310° C. When the sixth driving method is used, the process is relatively easy, and a greater temperature difference than that of the fourth and fifth driving methods may be obtained.

Figure 24:
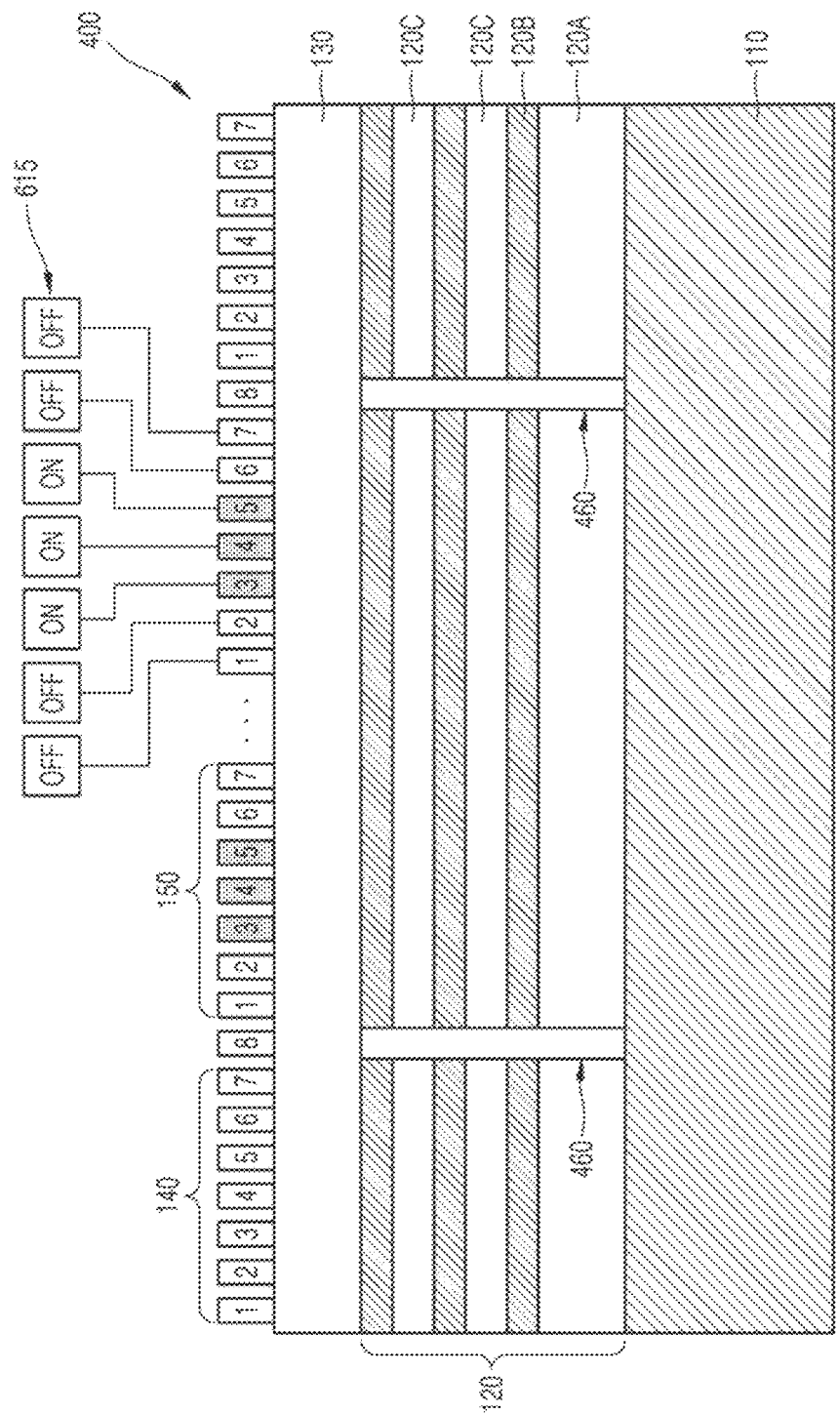
FIG. 24 is a cross-sectional view showing a seventh driving method of a spatial light modulator according to an example embodiment.

FIG. 24 shows a seventh driving method of a spatial light modulator according to an example embodiment. The seventh driving method may be a driving method for the fourth spatial light modulator 400.

As shown in FIG. 24, the seventh driving method is a method of applying a current only to the HCGs 3 and 5 in the central region among the HCGs 1 to 7 included in the second pixel 150 which is the driving pixel, and the driving method itself may be the same as the first driving method or the sixth driving method.

In the case of the fourth spatial light modulator 400, the trench 460 formed between the driving pixel 150 and the non-driving pixel 140 does not penetrate through the cavity layer 130, but completely penetrates through the DBR layer 120. Accordingly, the second layer 120B having relatively high thermal conductivity is disconnected between the driving pixel 150 and the non-driving pixel 140. At the same time, because no current is applied to the HCGs 1, 2, 6, and 7 of the driving pixel 150 adjacent to the non-driving pixel 140, heat transfer from the driving pixel 150 to the non-driving pixel 140 may be minimized or blocked.

Figure 25:
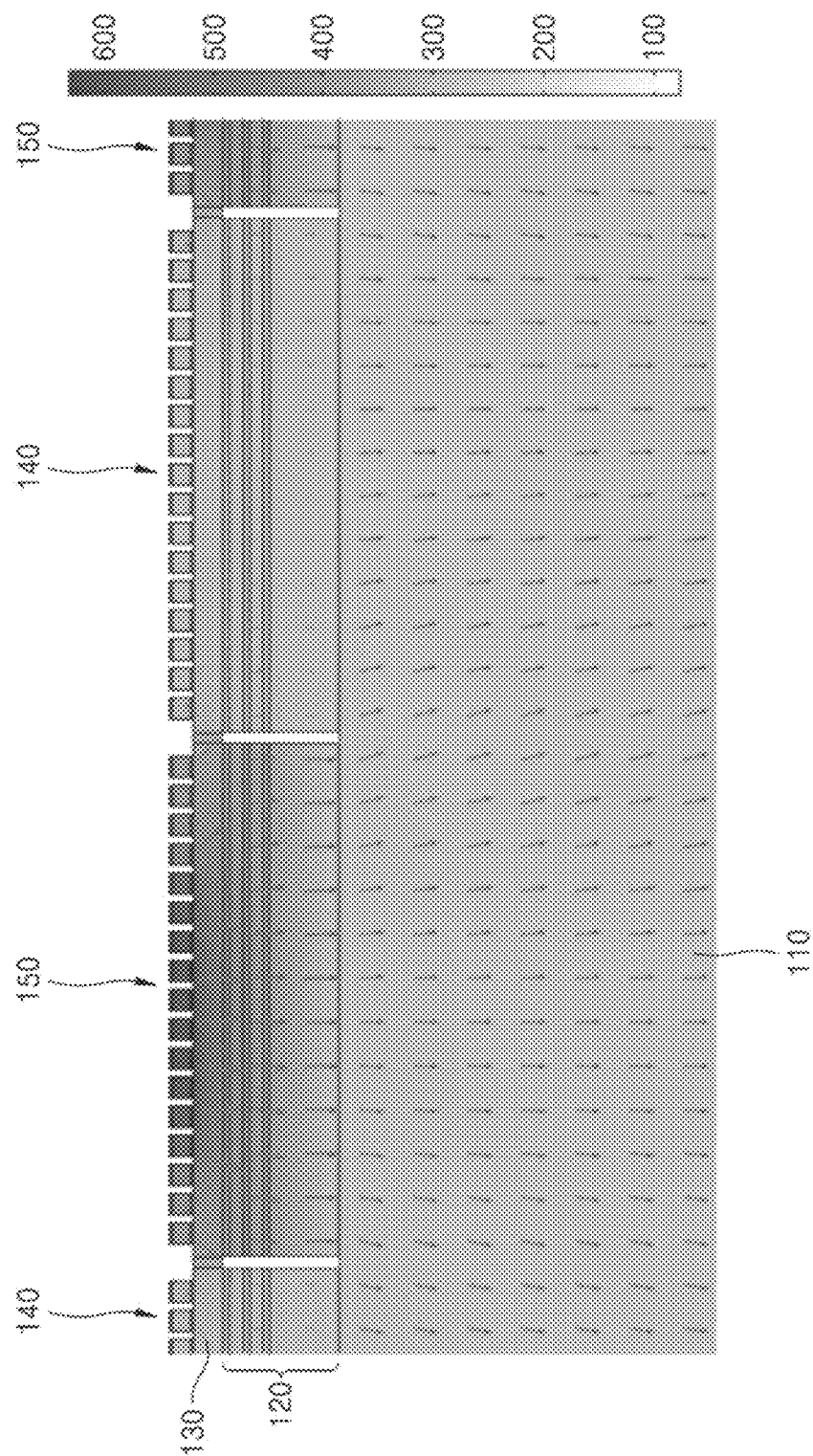
FIG. 25 is a cross-sectional view showing simulation results for the transmission of heat generated in the driving pixel of the spatial light modulator according to the seventh driving method of FIG. 24.

This may be confirmed from simulation results of heat generation and transfer according to the driving of the fourth spatial light modulator 400 shown in FIG. 25.

The settings for the fourth spatial light modulator 400 used to obtain the simulation results of FIG. 25 may be the same as the settings for the first driving method except that the trench 460 penetrates through only the DBR layer 120 and the HCG 8 is provided directly above the trench 460.

FIG. 25 illustrates that the temperature is the highest in the central region of the driving pixel 150, the temperature decreases toward the edges, and the non-driving pixel 140 maintains a relatively low temperature. As indicated by arrows, most of Joule heat generated in the driving pixel 150 moves to a lower end of the corresponding driving pixel 150 and is transferred to the lower end of the substrate 110 through the substrate 110. Although some of the Joule heat is transmitted to the non-drive pixel 140 via the cavity layer 130, the degree of heat transfer may be very low compared to a driving of the spatial light modulator (FIG. 31) of the related art.

As a result, FIG. 25 suggests that heat leakage from the driving pixel 150 in the seventh driving method is much less compared to the driving of the spatial light modulator of related art.

Figure 26:
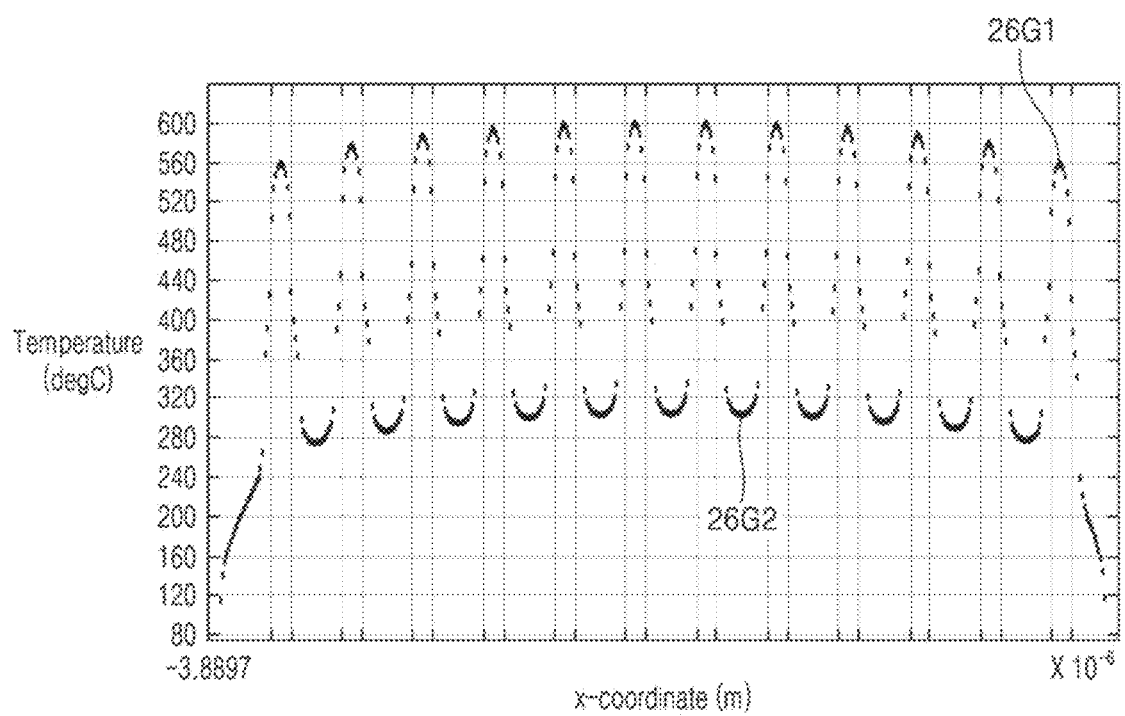
FIG. 26 is a graph showing a temperature distribution of a driving pixel and a non-driving pixel of the spatial light modulator according to the seventh driving method of FIG. 24.

FIG. 26 shows a temperature distribution of a driving pixel and a non-driving pixel in the seventh driving method.

In FIG. 26, the horizontal axis indicates position, and the vertical axis indicates temperature.

In FIG. 26, first graphs 26G1 show temperature distributions for driving pixels, and a second graph 26G2 shows a temperature distribution for a non-driving pixel, respectively.

Each of the plurality of first graphs 26G1 represents one driving pixel, and points constituting the one graph 26G1 each indicate an HCG included in one driving pixel. In addition, each concave node constituting the second graph 26G2 represents one non-driving pixel. Although the concave node of the second graph 26G2 is not large even between HCGs included in one non-driving pixel, it suggests that there is a temperature difference.

When comparing the first and second graphs 26G1 and 26G2 of FIG. 26, the maximum temperature difference between the adjacent driving pixel and the non-driving pixel is about 295° C.

When the seventh driving method is used, some of heat generated in the driving pixel 150 is transferred to the non-driving pixel 140 through the cavity layer 130, but the degree of transfer is insignificant, and most of the heat is moved downward of the driving pixel 150. For example, the amount of heat flow in a downward direction is greatly dominant rather than that in a lateral direction of the driving pixel 150.

In the case of the seventh driving method, the fourth spatial light modulator 400 is targeted, and in the fourth spatial light modulator 400, an HCG may be formed on the cavity layer 130 directly above the trench 460. For example, unlike the first to third spatial light modulators 100, 200, and 300, the fourth spatial light modulator 400 may include the HCG uniformly provided on an entire surface of the cavity layer 130 on which the HCG is formed. Accordingly, in the seventh driving method, light loss may be relatively reduced. Similar to the case of other driving methods, the process may be easier when the seventh driving method is used.

Figure 27:
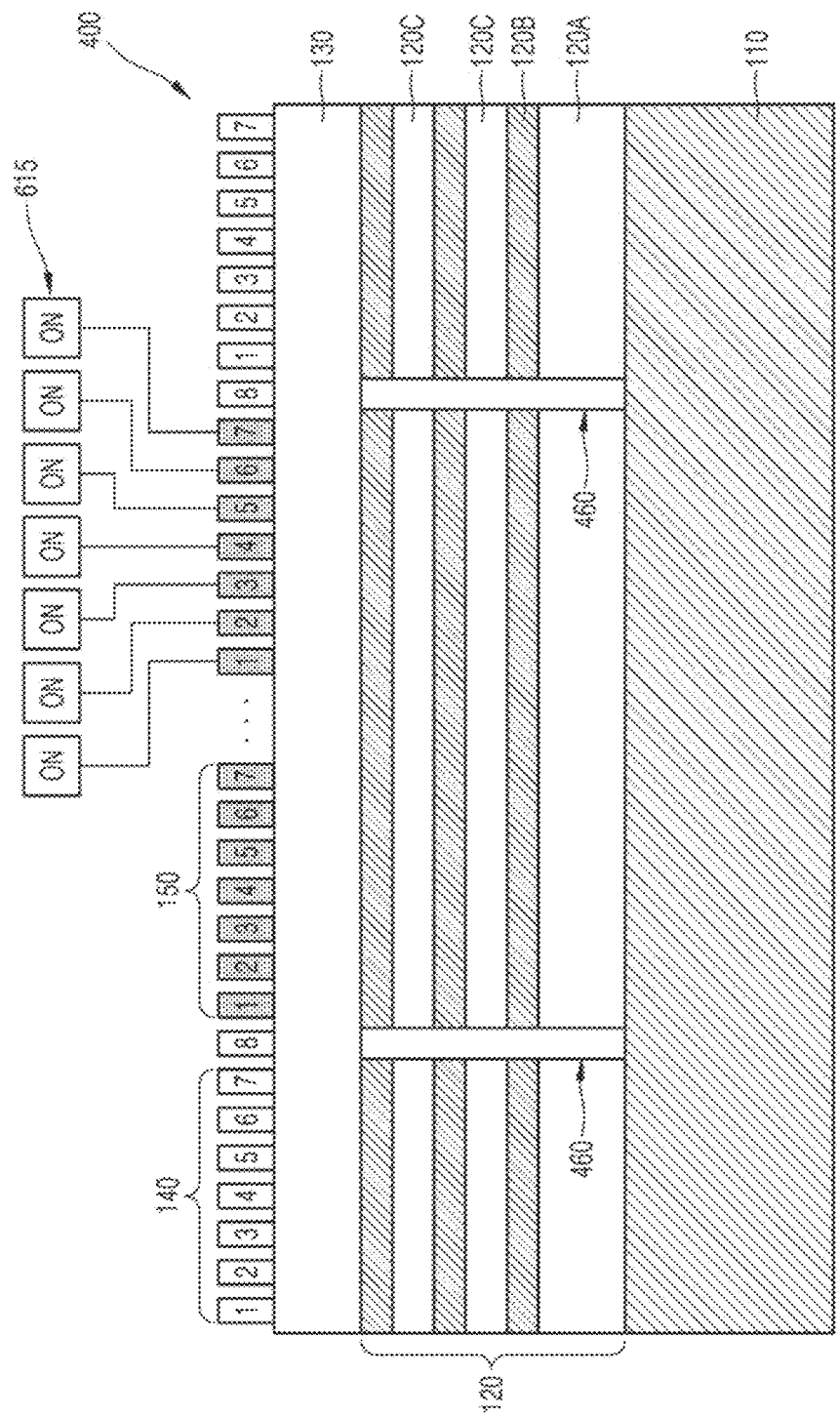
FIG. 27 is a cross-sectional view showing an eighth driving method of a spatial light modulator according to an example embodiment.

FIG. 27 shows an eighth driving method of a spatial light modulator according to an example embodiment. The eighth driving method may be another driving method for the fourth spatial light modulator 400.

As shown in FIG. 27, the eighth driving method is a method of applying a current to all of the HCGs 1 to 7 included in the second pixel 150 which is a driving pixel, and the driving method itself may be the same as the second driving method, the third driving method, or the fifth driving method.

Figure 28:
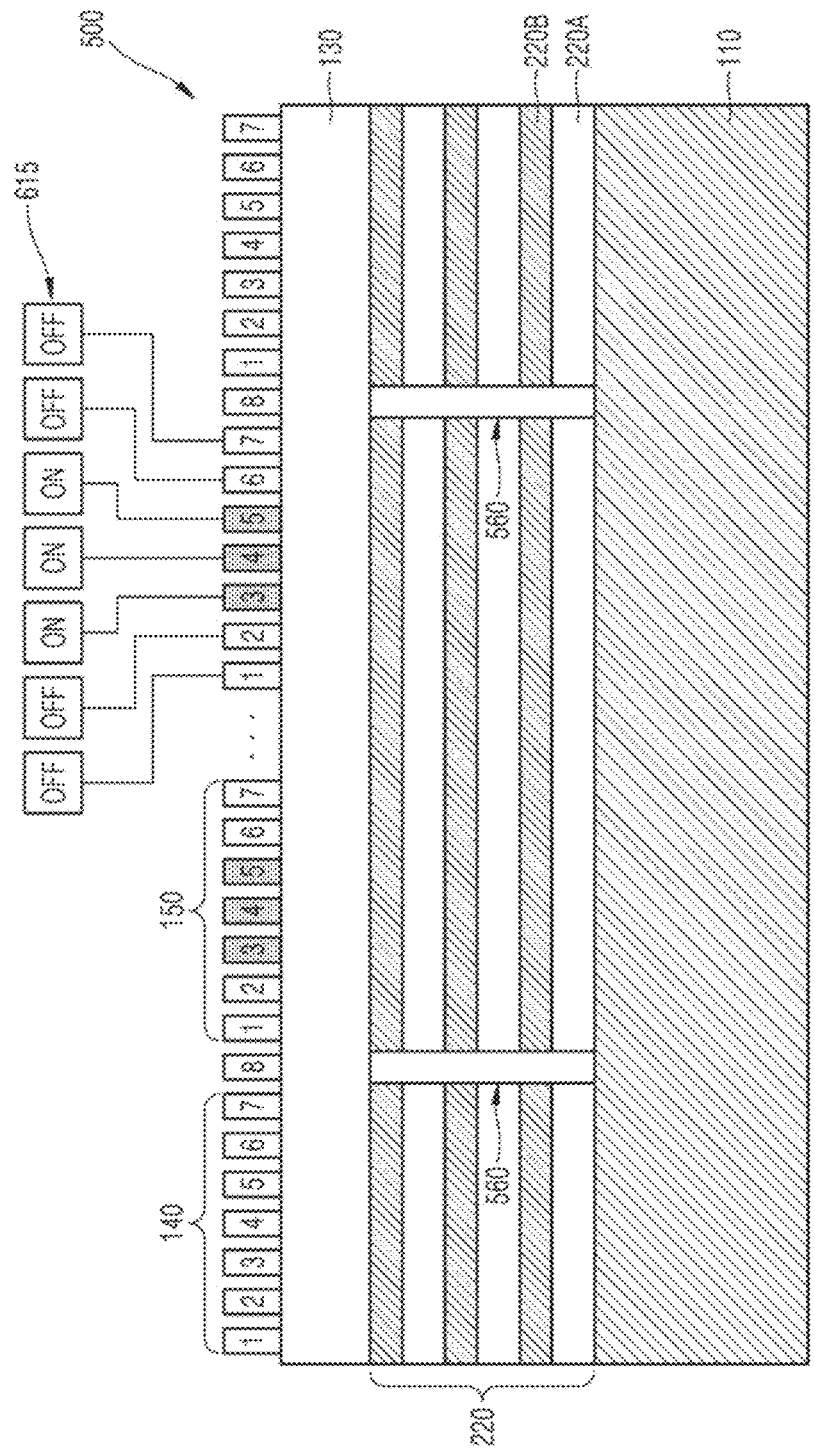
FIG. 28 is a cross-sectional view showing a ninth driving method of a spatial light modulator according to an example embodiment.

FIG. 28 shows a ninth driving method of a spatial light modulator according to an example embodiment. The ninth driving method may be a driving method for the fifth spatial light modulator 500.

As shown in FIG. 28, the ninth driving method is a method of applying a current only to some HCGs 3, 4, and 5 of the HCGs 1 to 7 included in the second pixel 150 which is a driving pixel, and the driving method itself may be the same as the first driving method, the fourth driving method, or the sixth driving method, and the like.

Figure 29:
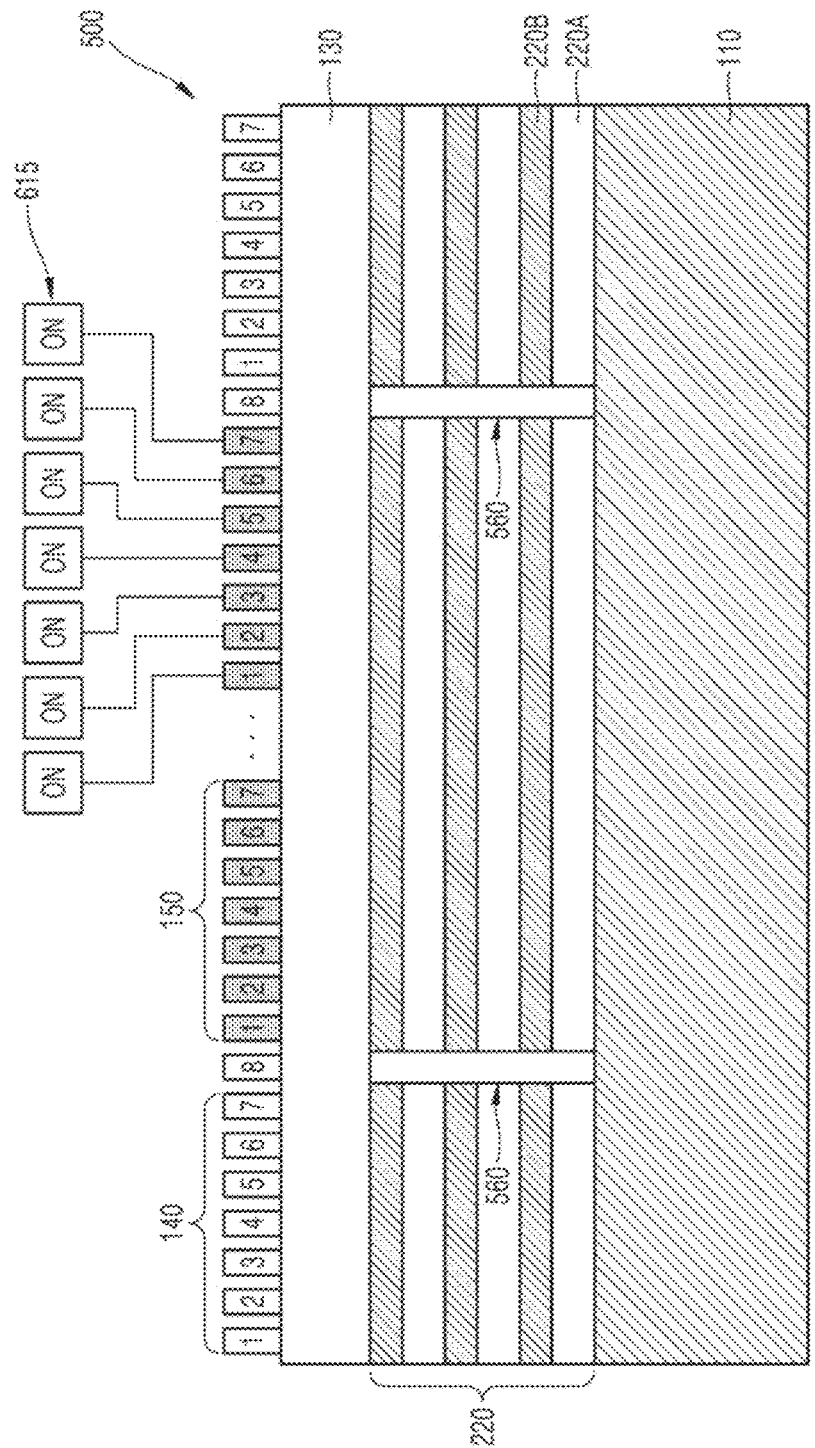
FIG. 29 is a cross-sectional view showing a tenth driving method of a spatial light modulator according to an example embodiment.

FIG. 29 shows a tenth driving method of a spatial light modulator according to an example embodiment. The tenth driving method may be another driving method for the fifth spatial light modulator 500.

As shown in FIG. 29, the tenth driving method is a method of applying a current to all of the HCGs 1 to 7 included in the second pixel 150, which is a driving pixel, and the driving method itself may be the same as the second driving method, the third driving method, or the fifth driving method, and the like.

Next, a spatial light modulator of the related art for comparison with the spatial light modulators according to the above-described example embodiments will be described.

Figure 30:
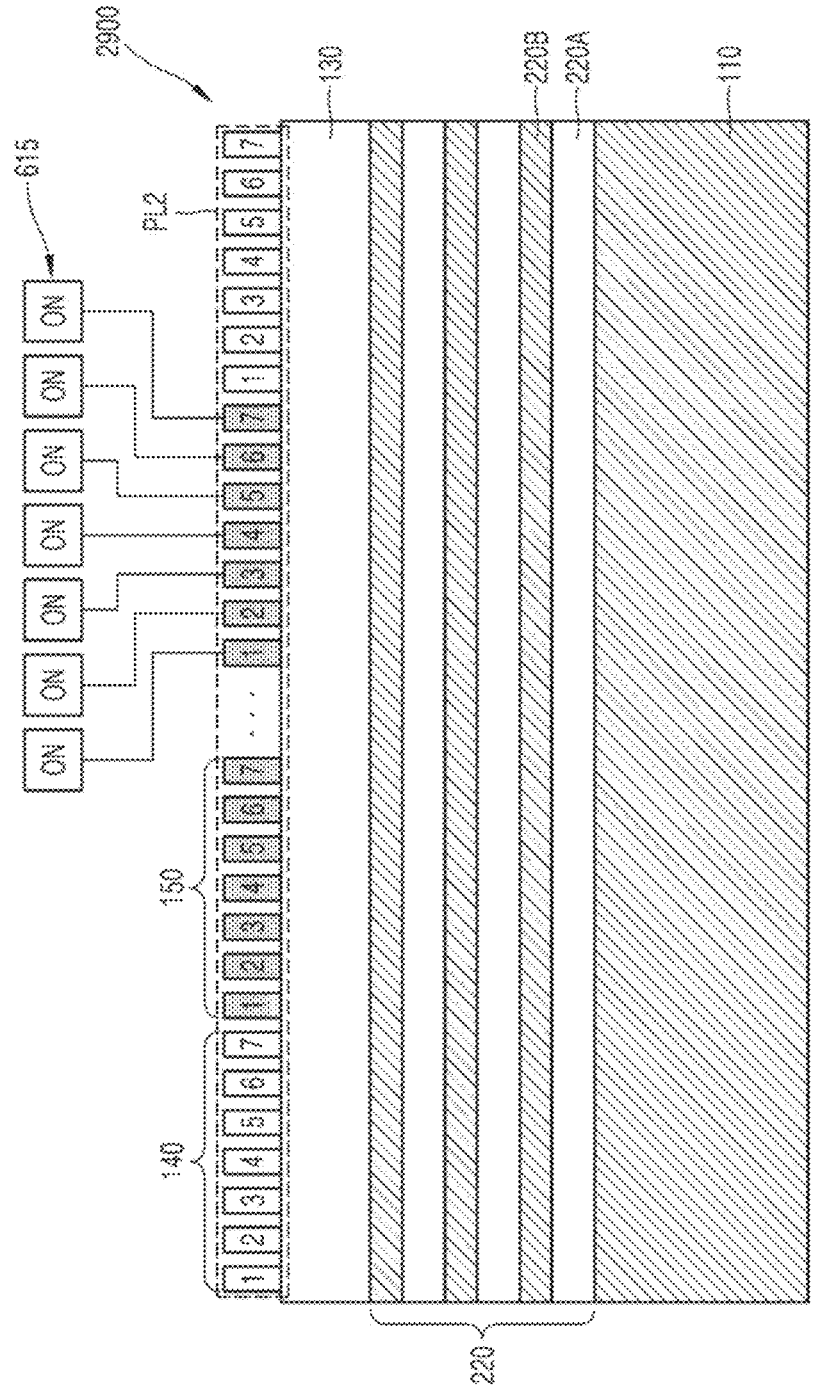
FIG. 30 is a cross-sectional view showing a spatial light modulator of the related art and a driving method thereof.

FIG. 30 shows a spatial light modulator 2900 of related art.

Referring to FIG. 30, the spatial light modulator 2900 of the related art includes a substrate 110 and a DBR layer 220, a cavity layer 130, and a pixel layer PL2 sequentially stacked on the substrate 110. The pixel layer PL2 includes a plurality of first pixels 140 and a plurality of second pixels 150, but the first and second pixels 140 and 150 are not spaced apart from each other. For example, a plurality of HCGs 1 to 7 are uniformly distributed on an entire upper surface of the cavity layer 130. The spatial light modulator 2900 of the related art does not include a trench or a structure (pattern) corresponding to the trench.

The spatial light modulator 2900 of related art may be driven by using the first pixel 140 as a non-driving pixel and applying a current to all of the HCGs 1 to 7 included in the second pixel 150, which is a driving pixel.

For comparison, the spatial light modulator 2900 of the related art may be driven by using binary driving so that the same amount of Joule heat as the Joule heat generated by driving the spatial light modulator according to the example embodiment is generated.

Figure 31:
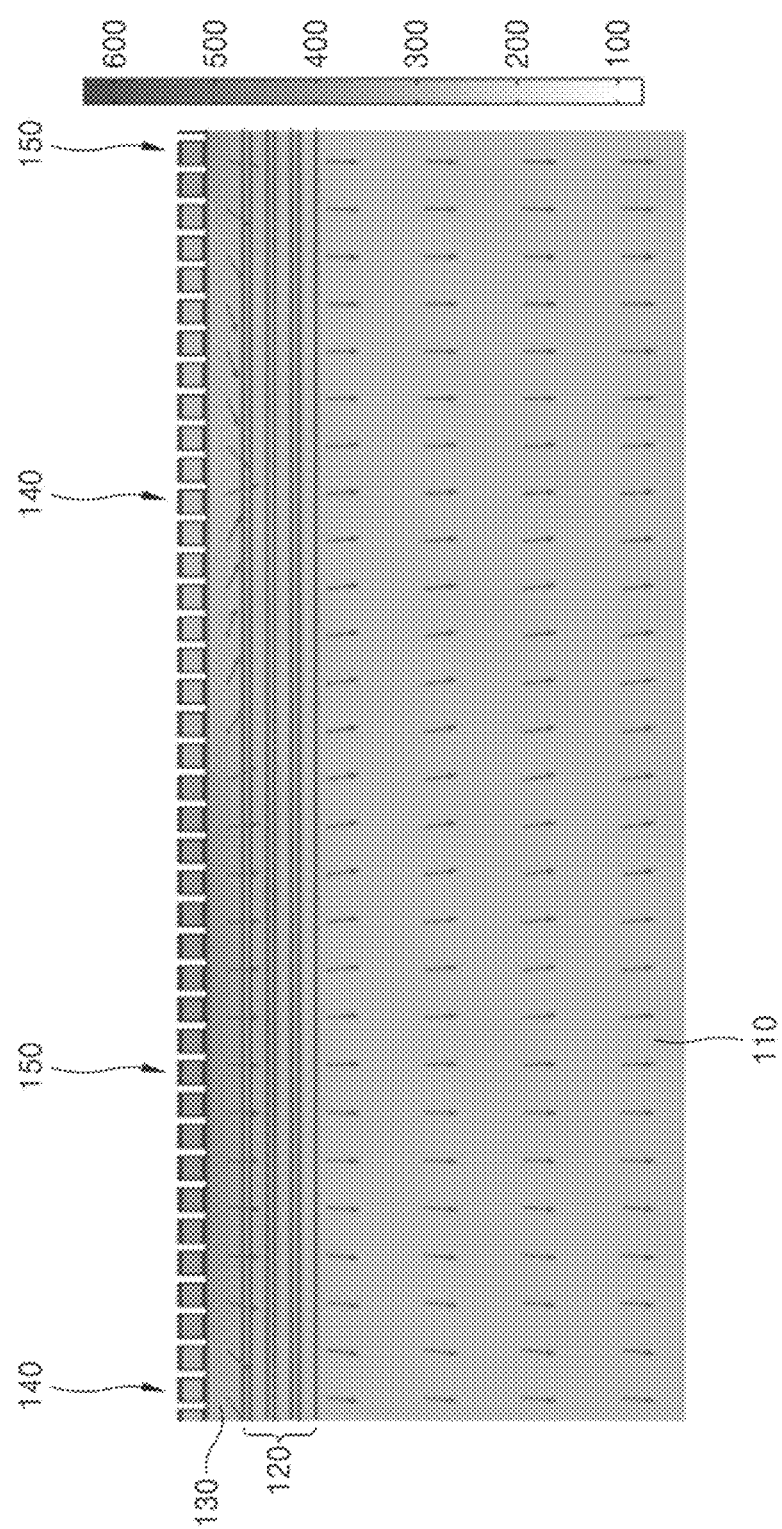
FIG. 31 is a cross-sectional view illustrating simulation results for the transmission of heat generated in a driving pixel according to the driving method of the spatial light modulator of the related art of FIG. 30.

FIG. 31 shows simulation results of heat generation and heat transfer in the driving pixel 150 in binary driving of the spatial light modulator 2900 of the related art shown in FIG. 30.

The settings for each layer of the spatial light modulator 2900 of the related art used to obtain the simulation results of FIG. 31 may be the same as the settings described with reference to FIG. 13.

Referring to FIG. 31, heat (arrow) generated in the driving pixel 150 is transferred to the non-driving pixel 140 through the cavity layer 130 and the DBR layer 220 directly under the HCG. The amount of heat (length of the arrow) transferred to the non-driving pixel 140 is similar to the amount transferred from the driving pixel 150 to the substrate 110. This result suggests severe heat leakage.

Figure 32:
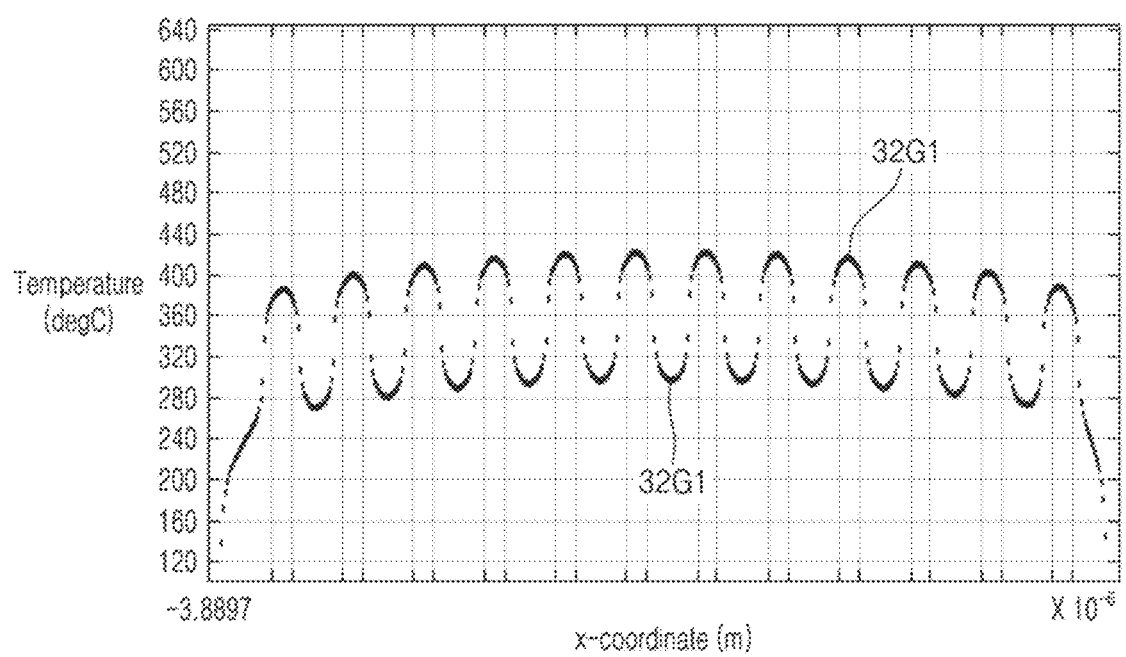
FIG. 32 is a graph showing a temperature distribution of a driving pixel and a non-driving pixel of the spatial light modulator according to the driving method of the spatial light modulator of FIG. 30.

FIG. 32 shows a temperature distribution of a driving pixel and a non-driving pixel in the driving of the spatial light modulator 2900 of related art.

In FIG. 32, the horizontal axis indicates position, and the vertical axis indicates temperature.

In FIG. 32, a first graph 32G1 indicates a temperature distribution for the driving pixel, and a second graph 32G2 indicates a temperature distribution for a non-driving pixel, respectively.

Referring to FIG. 32, a temperature difference between the adjacent driving pixel and the non-driving pixel is about 140° C., and this value corresponds to about 40% of the maximum temperature difference (350° C.) between the adjacent driving pixel and the non-driving pixel shown in the first driving method of the spatial light modulator according to the example embodiment.

In order to focus light emitted from the spatial light modulator to a desired position, it is advantageous that the temperature difference between the driving pixel and the non-driving pixel is large. Considering this point, the result of the spatial light modulator of the related art suggests that a beam focusing performance for a point to be scanned may be deteriorated, and a device efficiency is also low.

Figures 33A, 33B:
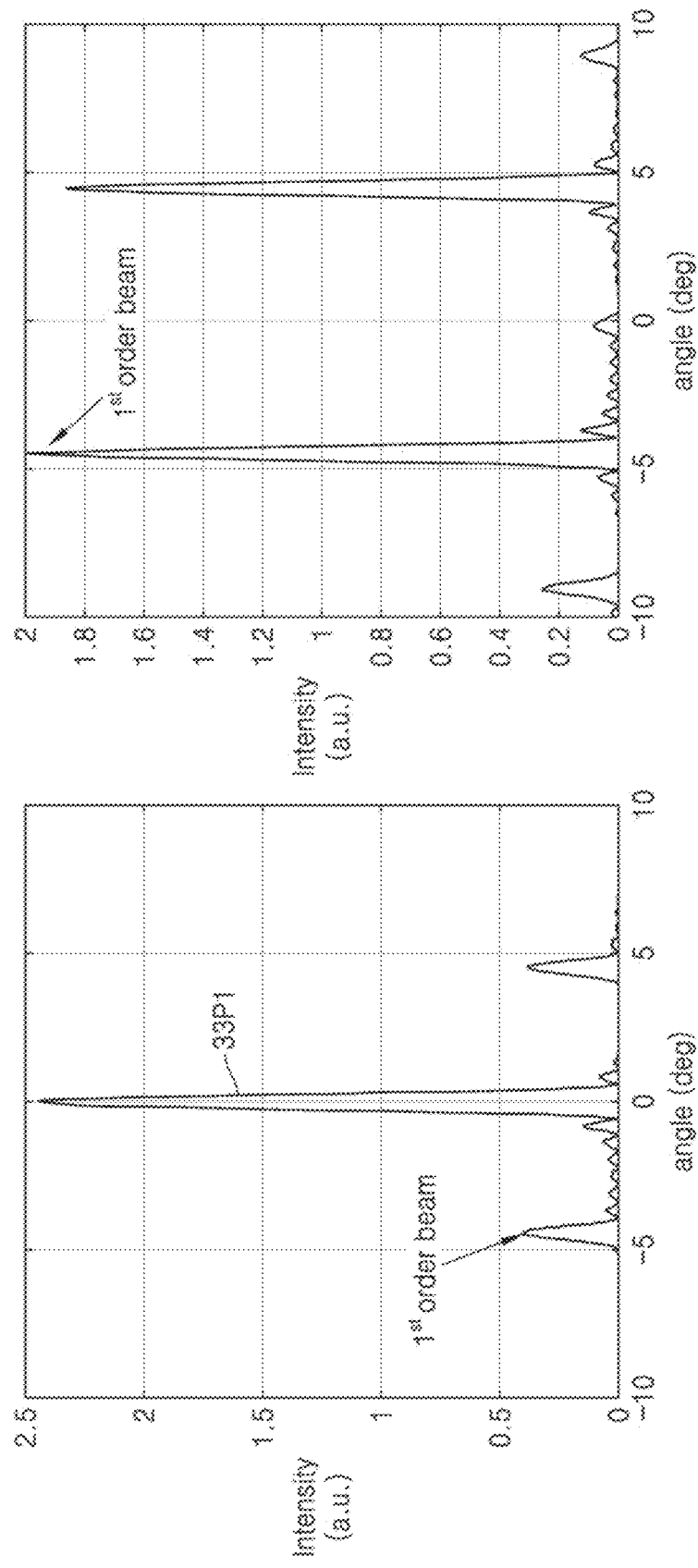
FIGS. 33A and 33B are graphs showing a distribution of emitted light according to the driving method of the spatial light modulator of the related art of FIG. 30 and the driving method according to example embodiments.

FIGS. 33A and 33B are graphs showing a distribution of emitted light according to a driving method of the spatial light modulator 2900 of related art shown in FIG. 30 and a driving method according to an example embodiment described above.

FIG. 33A is a graph showing a distribution of emitted light according to a driving method of the spatial light modulator 2900 of related art, and FIG. 33B is a graph showing a distribution of emitted light according to a driving method of a spatial light modulator according to an example embodiment.

In FIG. 33A and FIG. 33B, the horizontal axis represents a beam radiation angle (diffraction angle), and the vertical axis represents light intensity.

In FIG. 33A, a peak 33P1 indicates $0^{th}$ order beam or $0^{th}$ order diffraction beam, and the "$1^{st}$ order beam" of FIG. 33A and FIG. 33B indicates $1^{st}$ order beam or $1^{st}$ order diffraction beam.

According to FIG. 33A, in the distribution of emitted light according to the driving method of the spatial light modulator of the related art, the $0^{th}$ order beam is greatly dominant, and the $1^{st}$ order beam measured in the vicinity of 5° is weak by less than 0.5.

On the other hand, as shown in FIG. 33B, in the distribution of emitted light according to the driving method of the spatial light modulator according to an example embodiment, the $1^{st}$ order beam measured in the vicinity of 5° is greatly dominant, and the intensity of the $0^{th}$ order beam is weaker than that of the $1^{st}$ order beam in FIG. 33A.

In the emitted light distribution of the spatial light modulator, the $1^{st}$ order beam in the vicinity of 5° is a desired signal, and considering that a small signal (e.g., a high order beam that is a $2^{nd}$ order beam or more) at a different location from the $0^{th}$ order beam located at 0° is a result of light leakage that is not properly controlled, it may be determined that the performance of the spatial light modulator is excellent as the intensity of the $1^{st}$ order beam is relatively great.

From this point of view, it may be seen that the performance of the spatial light modulator having the light distribution of FIG. 33B is superior to that of the spatial light modulator having the light distribution of FIG. 33A.

As an index for quantifying the performance of the spatial light modulator, a side mode suppression ratio (SMSR) is used, which expresses a ratio of the magnitude of a desired signal to the largest signal among the remaining signals in decibels.

In the case of FIG. 33A, the SMSR is about −8.1 dB, while in the case of FIG. 33B, the SMSR is about 13.5 dB.

The result suggests that the performance of the spatial light modulator may be improved by using the spatial light modulator and the driving method thereof according to an example embodiment.

The spatial light modulator according to the example embodiment described above may be an apparatus by itself, or may be used as a component or element constituting another apparatus.

Accordingly, the spatial light modulator according to an example embodiment may be applied to apparatuses in various fields, for example, it can be applied to a scanner constituting a time-of-flight (TOF) sensor for light detection and ranging (LiDAR), or a motion recognition sensor, a depth sensor, and an authentication sensor including a beam scanner, and the like. In addition, the spatial light modulator according to an example embodiment may be mounted on mobile and wearable devices that require peripheral recognition by additionally achieving reduction of power consumption and form factor as a LiDAR system is applied to a mobile device.

Figure 34:
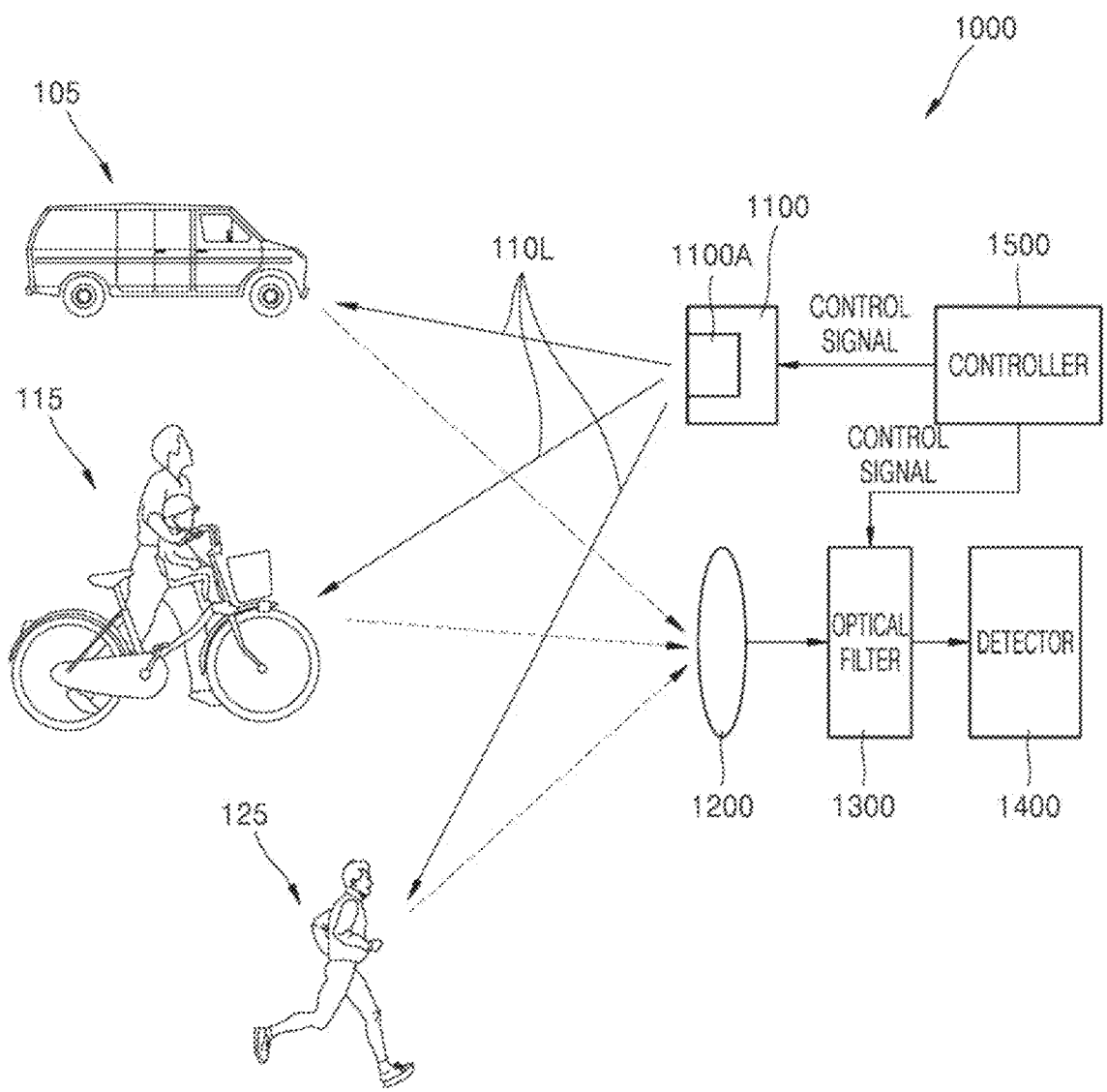
FIG. 34 is a block diagram of an apparatus (e.g., a depth camera) including a spatial light modulator according to an example embodiment.

FIG. 34 schematically shows a LiDAR system 1000 as an example of a device to which a spatial light modulator according to an example embodiment is applied.

Referring to FIG. 34, the LiDAR system 1000 includes a light emitter 1100, a lens unit 1200, an optical filter unit 1300, a detector 1400, and a controller 1500. When necessary for obtaining and processing information on first to third subjects 105, 115, and 125, the LiDAR system 1000 may further include other components in addition to the above components. In order to detect and recognize the subjects 105, 115, and 125, light is emitted from the light emitter 1100 to the objects 105, 115, and 125.

The number and shape of the subjects 105, 115, and 125 are symbolic and are not limited thereto. The subjects may be various objects, for example, a fixed or moving object may also be a subject, and as long as it reflects light, any object may be a subject.

Light 110L emitted from the light emitter 1100 toward the subjects 105, 115, and 125 may be light included in the infrared region, but is not limited thereto, and any light that is generally recognized as not harmful to the human body may be used.

The light emitter 1100 may include a light source module 1100A. The light source module 1100A may include a light source configured to generate light and an optical scanner configured to receive light emitted from the light source and to irradiate the light to the subjects 105, 115, and 125. The optical scanner may include one of the spatial light modulators according to the above-described example embodiments. The light source may be a light source configured to emit light of various wavelengths, for example, laser light according to a given light emission signal. The light source may include, for example, a Si photonics optical phased array (OPA) including a plurality of unit light sources (or cell light sources). A wavelength of the light 110L emitted from the light source module 1100A may be controlled by a control signal given from the controller 1500. The control signal may include a light emission signal. The light 110L emitted from the light source module 1100A is reflected from the subjects 105, 115, and 125 and is incident on the lens unit 1200.

Although the lens unit 1200 is illustrated as a single lens, it may be a lens optical system including a plurality of lenses to converge incident light to the optical filter unit 1300. Light incident on the lens unit 1200 is converged by the lens unit 1200 and is incident on the optical filter unit 1300.

The optical filter unit 1300 may perform an operation of passing only light of a specific wavelength or light of a wavelength that belongs to a specific band, and blocking or substantially blocking the remaining light. The optical filter unit 1300 may be configured to actively perform such an operation. To this end, the optical filter unit 1300 may include an active device that transmits only light, a central wavelength of which is a specific wavelength, and blocks or substantially blocks light of other wavelengths in response to a control signal given from the controller 1500. The control signal given to the optical filter unit 1300 may include information about the central wavelength of the light to be passed through the active device, where the central wavelength may correspond to the central wavelength of the light emitted from the light emitting unit 1100.

As a result, the control signal given to the optical filter unit 1300 may include a control signal that matches a center wavelength of the light emitted from the light emitter 1100 and a center wavelength of the light to pass through the active device of the optical filter unit 1300. This control signal given to the optical filter unit 1300 from the controller 1500 may be given in real time together with the control signal given to the light emitter 1100 from the controller 1500. Therefore, the control of the wavelength of the light 110L emitted from the light emitter 1100 and the control of the central wavelength of the light passing through the active device of the optical filter unit 130 may be performed in real time through the controller 1500. This may denote that a scan of a scan area including the subjects 105, 115, and 125 of the LiDAR system 1000 according to an example embodiment may be performed in real time.

Due to the active device included in the optical filter unit 1300, the optical filter unit 1300 may selectively pass only desired light and block other noise light including natural light. Accordingly, a signal-to-noise ratio (S/N) of the LiDAR system 1000 may be increased. As an example of the active device, the optical filter unit 1300 may include a tunable bandpass filter. The operation method of the tunable bandpass filter may be a liquid crystal method or an acousto-optic method.

Light passing through the optical filter unit 1300 is incident on the detector 1400. The detector 1400 senses the light received from the light filter unit 1300 and acquires various information about the subjects 105, 115, and 125 based on the information included in the light. For example, the detector 1400 detects time delay or phase difference information from the incident light, and based on the information, distance information to the subjects 105, 115, and 125, location information of the subjects 105, 115, and 125, a depth image of the subjects 105, 115, and 125 may be obtained. To this end, the detector 1400 may include a time to digital converter (TDC), an image sensor, and the like.

The controller 1500 may be disposed between the light emitter 1100 and the light filter unit 1300. The controller 1500 controls the operations of the light emitter 1100 and the light filter unit 1300. The controller 1500 sends a light emission start signal to the light emitter 1100 so that light of a specific wavelength is emitted. For example, the control unit 1500 determines a wavelength of light to be emitted, and sends a control signal including information on an electrical signal required to emit light of the determined wavelength to the light emitter 1100 so that the light having the determined wavelength is emitted from the light source module 1100A. The control unit 1500 controls the optical filter unit 1300 so that a wavelength of light passing through a transmission center of the optical filter unit 1300 becomes a wavelength of light emitted from the light emitter 1100 by sending a light emission start signal to the light emitter 1100 and, at the same time, sending a control signal to the optical filter unit 1300. The controller unit 1500 may include at least one processor, an application specific integrated circuit (ASIC), a field-programmable gate array (FPGA), a dedicated microprocessor, a microprocessor, a general purpose processor, or the like.

Next, a method of manufacturing a spatial light modulator according to an example embodiment will be described with reference to FIGS. 35 to 37. Like reference numbers as those mentioned in the spatial light modulator according to the above-described example embodiment refer to like elements, and the descriptions thereof will be omitted.

Figure 35:
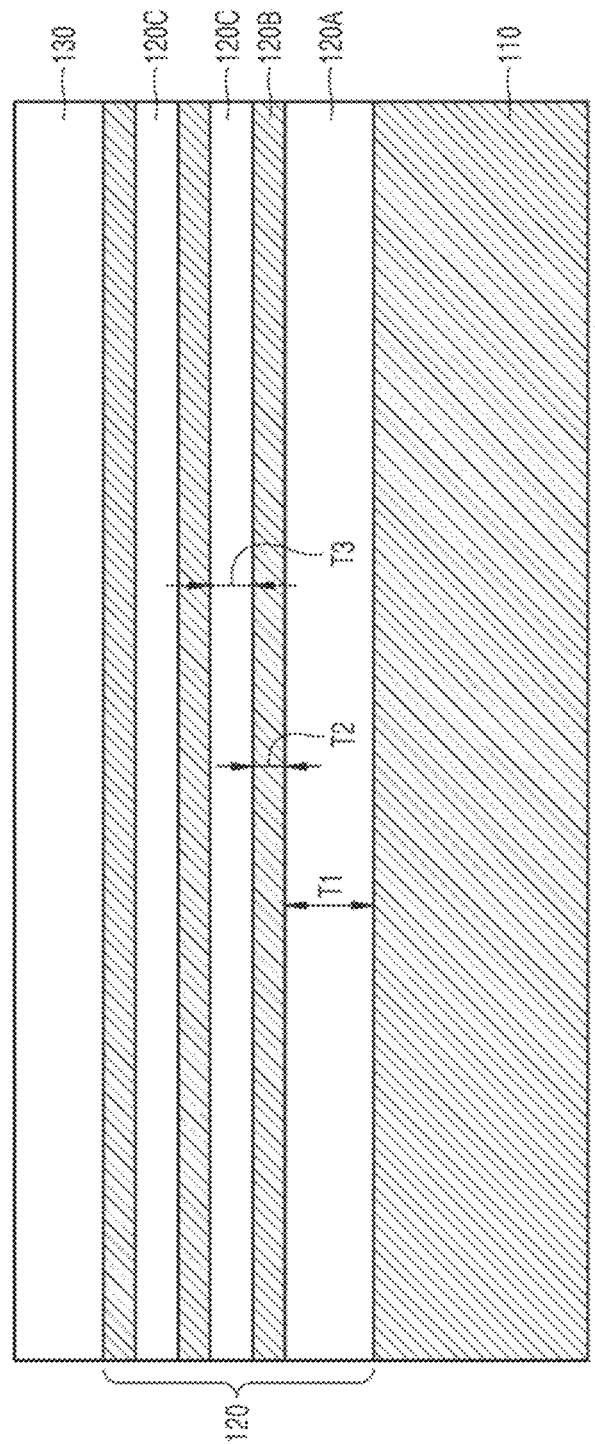
FIGS. 35, 36, and 37 are cross-sectional views illustrating by step a method of manufacturing a spatial light modulator according to an example embodiment.

First, as shown in FIG. 35, a DBR layer 120 and a cavity layer 130 are sequentially formed on a substrate 110. The DBR layer 120 may be formed to cover an entire one surface (e.g., an upper surface) of the substrate 110. The cavity layer 130 may be formed to cover an entire upper surface of the DBR layer 120. The upper surface of the DBR layer 120 may be parallel to or substantially parallel to the one surface of the substrate 110.

The DBR layer 120 may be formed by repeatedly alternately stacking a first layer 120A and a second layer 120B, for example, may be formed by repeatedly alternating stacking three times the first layer 120A and the second layer 120B. The number of repetitions and alternations may be three times or more than three or less than three. In the DBR layer 120, the first layer 120A initially formed on the substrate 110 may have a thickness T1 different from a thickness T3 of the remaining first layers 120A included in the DBR layer 120. In one example, the thickness T1 of the first layer 120A that is initially formed may be greater than the thickness T3 of the remaining first layers 120A.

Figure 36:
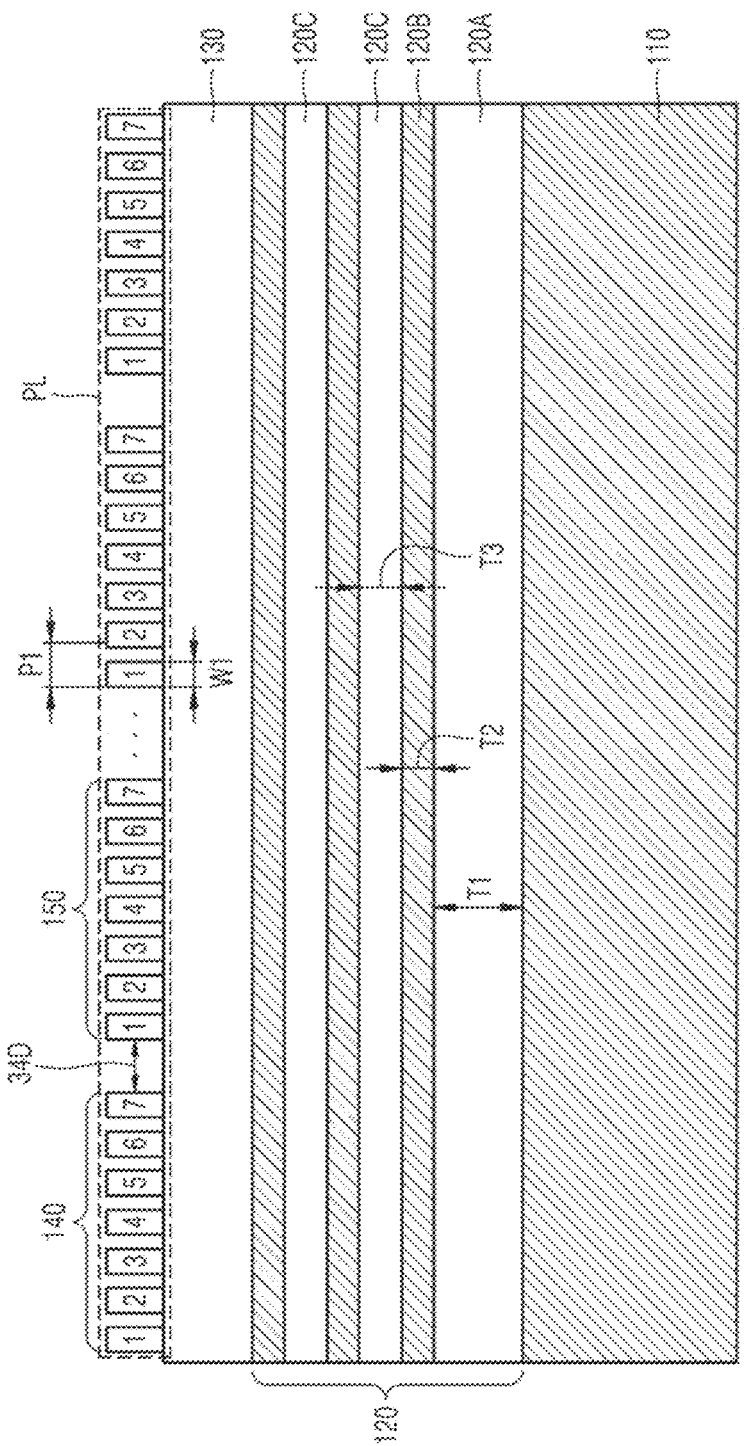

Next, as shown in FIG. 36, a pixel layer PL is formed on an upper surface of the cavity layer 130. In the pixel layer PL, a plurality of first pixels 140 and a plurality of second pixels 150 are horizontally, repeatedly, and alternately arranged. The first and second pixels 140 and 150 may be formed to be spaced apart from each other. The first and second pixels 140 and 150 each include a plurality of active HCGs 1 to 7. However, the number of active HCGs included in each of the pixels 140 and 150 is not limited to seven, and each pixel 140 and 150 may include seven or less active HCGs or seven or more active HCGs. The plurality of active HCGs 1 to 7 may be identical to or substantially identical to each other in all aspects such as shape, configuration, function, material, and the like. The plurality of active HCGs 1 to 7 included in each of the pixels 140 and 150 are spaced apart from each other, and a separation distance P1-W1 is less than a width W1 of each of the active HCGs 1 to 7. Each of the plurality of active HCGs 1 to 7 included in the first and second pixels 140 and 150 may be electrically driven and may be an active meta-pattern. Accordingly, the pixel layer PL may be a meta-surface or a meta-surface layer including a plurality of active meta-patterns.

Such a meta-surface may be formed by depositing a meta-material layer on the upper surface of the cavity layer 130 and then patterning the deposited meta-material layer. In one example, the patterning of the deposited meta-material layer may be performed by using a photolithography process of a semiconductor manufacturing process, but is not limited thereto.

In an operation of forming the pixel layer PL, the first and second pixels 140 and 150 are formed to be spaced apart from each other, but a mutually spaced distance 36D of the first and second pixels 140 and 150 may be less than an alignment period P1 of the active HCGs 1 to 7 included in each of the pixels 140 and 150 and greater than a width W1 of each of the active HCGs 1 to 7.

Figure 37:
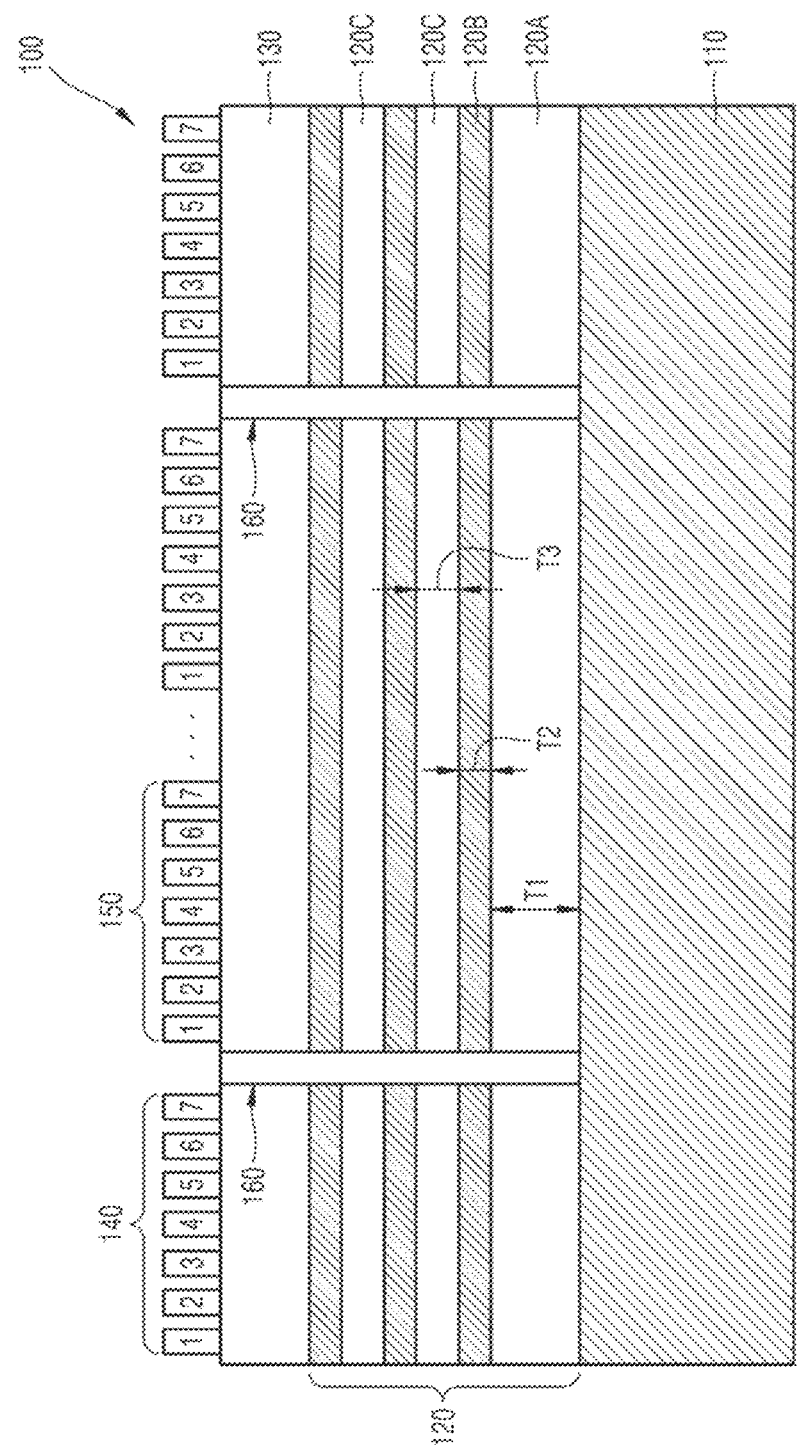

Next, as shown in FIG. 37, a trench 160 through which the one surface of the substrate 110 is exposed is formed between the first and second pixels 140 and 150. The trench 160 is formed at a position spaced apart from the first and second pixels 140 and 150. The trench 160 is spaced apart from the active HCGs 1 to 7 included in the first and second pixels 140 and 150. The trench 160 may be formed by sequentially etching the cavity layer 130 and the DBR layer 120 in a state that the first and second pixels 140 and 150 are masked, and the etching is performed until the substrate 110 is exposed. A suitable etching method may be selected in consideration of a width and depth of the trench 160.

In this way, the first spatial light modulator 100 is formed.

In the process of manufacturing the first spatial light modulator 100 described above, the first layer 120A of the DBR layer 120 initially formed on the substrate 110 may be formed to have the same thickness as the thickness T3 of the other first layer 120A included in the DBR layer 120.

In addition, in the process of forming the trench 160, the depth of the trench 160 may be adjusted. For example, the trench 160 may be formed only until the lowermost first layer 120A of the DBR layer 120 is exposed.

In addition, the trench 160 may be filled with air or maintained in a vacuum state, but may be filled with a material capable of substantially reducing or blocking heat transfer from the driving pixel to the non-driving pixel due to low thermal conductivity. This case may also be applied to other manufacturing methods to be described later.

Next, a method of manufacturing a spatial light modulator according to an example embodiment will be described with reference to FIGS. 38 to 41.

Figure 38:
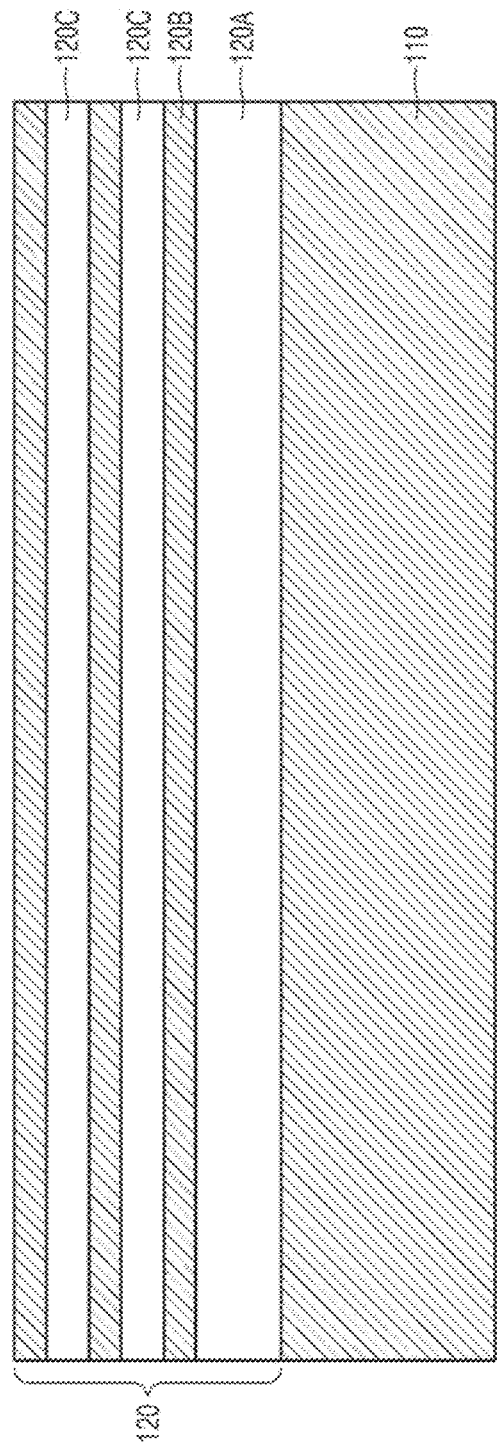

First, as shown in FIG. 38, a DBR layer 120 is formed on one surface of a substrate 110.

Figure 39:
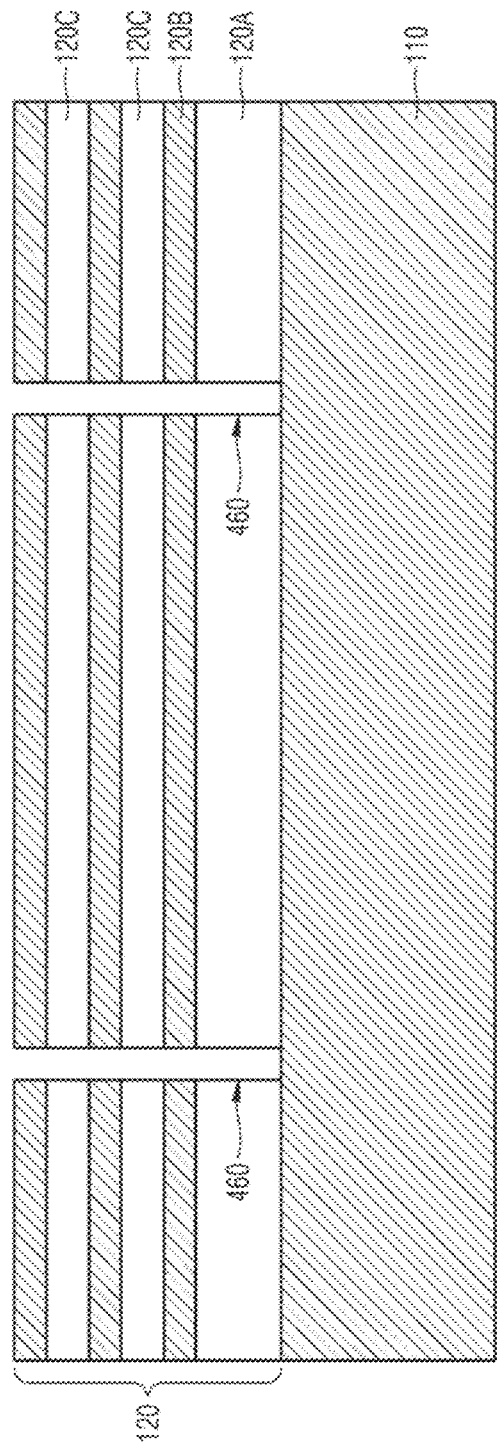

Next, as shown in FIG. 39, a trench 460 penetrating through the DBR layer 120 and exposing the one surface of the substrate 110 is formed. As the trench 460 is formed, the DBR layer 120 may be divided into a number equal to the number of pixels to be formed on a cavity layer 130 in a subsequent process. The position and width at which the trench 460 is formed may be the same as or substantially the same as the trench 160 of FIG. 37.

Figure 40:
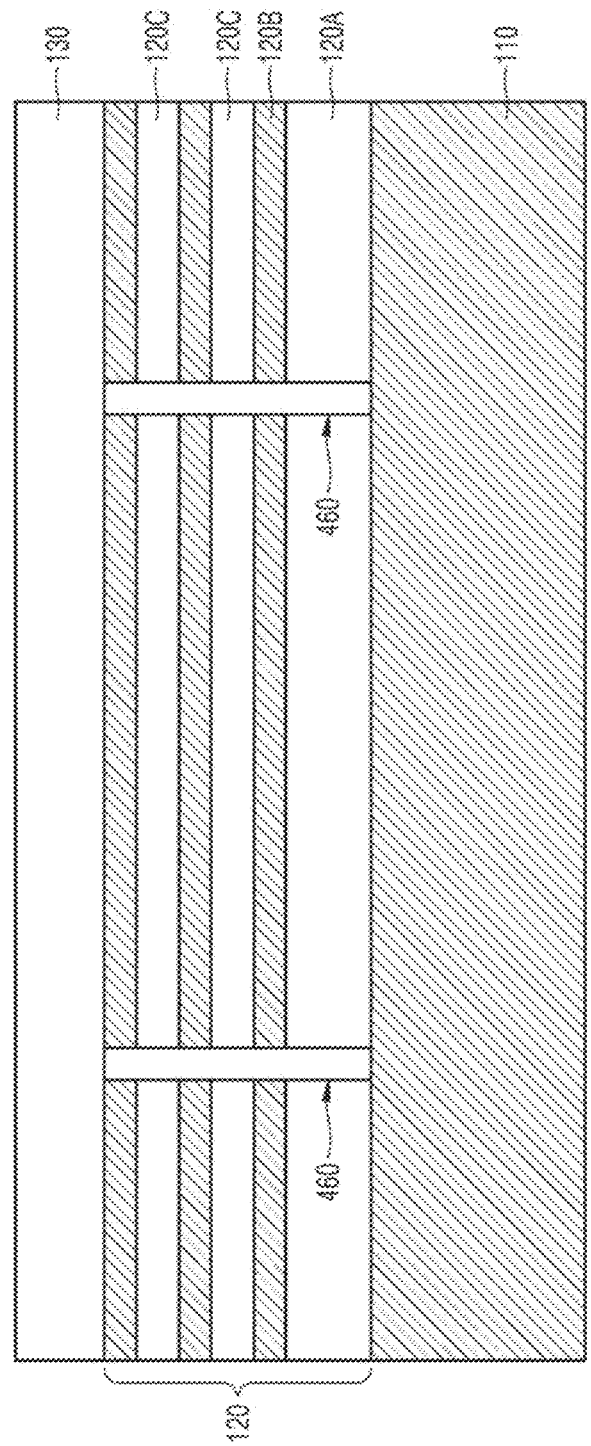

Next, as shown in FIG. 40, the cavity layer 130 covering the trench 460 is formed on the DBR layer 120. As the cavity layer 130 is formed, the trench 460 may be considered, at least in a cross-section, as a buried void in a stack including sequentially stacked substrate 110, the DBR layer 120, and cavity layer 130.

Next, as shown in FIG. 41, a pixel layer (PL1 in FIG. 5) is formed on the cavity layer 130. In the case of the pixel layer PL1, an HCG 8 is also formed in a region corresponding to an area between the first and second pixels 140 and 150 of the pixel layer PL of FIG. 36. Accordingly, the pixel layer PL1 does not include an empty region corresponding to the separation distance 34D of the first and second pixels 140 and 150 of the pixel layer PL of FIG. 36. That is, the pixel layer PL1 includes the active HCGs 1 to 8 uniformly distributed on an entire upper surface of the cavity layer 130.

In this way, the fourth spatial light modulator is formed.

In one example, in the operation of forming the trench 460, a depth of the trench 460 may be adjusted. For example, the trench 460 may be formed only until the lowermost first layer 120A of the DBR layer 120 is exposed.

In addition, the thickness of the lowermost first layer 120A of the DBR layer 120 may be the same as the thickness of the remaining first layer 120A.

In this way, by modifying each operation of the manufacturing process, various spatial light modulators may be formed.

While many details are set forth in the foregoing description, they should be construed as illustrative of example embodiments, rather than to limit the scope of the present disclosure. Therefore, the scope of the present disclosure should not be defined by the described example embodiments, but should be determined by the technical spirit described in the claims.

The disclosed spatial light modulator has a trench between a driving pixel and a non-driving pixel. The trench may be maintained in a vacuum state or filled with air, or it may be filled with a material having a lower thermal conductivity than the substrate, the DBR layer, and cavity layer included in the spatial light modulator.

The trench may be an example of a heat blocking member, and by providing such a trench, it is possible to minimize or block the transfer of heat generated from the driving pixel to the non-driving pixel. In other words, the trench may be a means (element) capable of minimizing or blocking thermal interference between the driving pixel and the non-driving pixel. Accordingly, the independence of the driving pixel and the non-driving pixel may be increased.

In addition, because the trench is provided, a temperature difference between the driving pixel and the non-driving pixel may be greater than that in a conventional spatial light modulator that does not include the trench. Accordingly, it is possible to more accurately focus emitted light at a desired location.

In addition, when the distribution of emitted light of the disclosed spatial light modulator is viewed, the intensity of an $0^{th}$ order beam and a high order beam is very low, but the intensity of the $1^{st}$ order beam is greatly dominant compared to the spatial light modulator of related art. Accordingly, when the disclosed spatial light modulator is used, the output and efficiency of the spatial light modulator may be increased. It should be understood that example embodiments described herein should be considered in a descriptive sense only and not for purposes of limitation.

Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims and their equivalents.

What is claimed is:

1. A spatial light modulator comprising:
   a substrate;
   a distributed Bragg reflector (DBR) layer provided on a surface of the substrate;
   a cavity layer provided on the DBR layer;
   a pixel layer provided on the cavity layer, the pixel layer comprising a plurality of pixels; and
   a heat blocking member provided between the plurality of pixels and configured to block heat transfer between the plurality of pixels,
   wherein each of the plurality of pixels comprises a plurality of active meta-patterns.

2. The spatial light modulator of claim 1, wherein each of the DBR layer and the cavity layer is divided corresponding to the plurality of pixels, and the heat blocking member is provided between the divided DBR layers and between the divided cavity layers.

3. The spatial light modulator of claim 2, wherein the DBR layer comprises:
   a plurality of first layers, each first layer of the plurality of first layers having a certain thermal conductivity; and
   a plurality of second layers, each second layer of the plurality of second layers having a thermal conductivity greater than the certain thermal conductivity of the first layer, wherein the plurality of first layers and the plurality of second layers are repeatedly alternately stacked, and wherein a thickness of a lowermost first layer from among the plurality of first layers is greater than a thickness of each of remaining first layers from among the plurality of first layers.

4. The spatial light modulator of claim 1, wherein the cavity layer is divided in correspondence with the plurality of pixels, and a portion of layers included in the DBR layer are divided in correspondence with the plurality of pixels, and wherein the heat blocking member is provided between the divided cavity layers and between all the divided layers of the DBR layer in a horizontal direction parallel to an upper surface of the substrate.

5. The spatial light modulator of claim 4, wherein the DBR layer comprises a plurality of first layers and a plurality of second layers having thermal conductivities different from each other and being repeatedly and alternately stacked in a vertical direction, among the plurality of first layers and the plurality of second layers, layers having a high thermal conductivity are divided, and layers having a low thermal conductivity are divided except for a lowermost layer.

6. The spatial light modulator of claim 5, wherein the heat blocking member and the substrate are spaced apart, and wherein the DBR layer comprises an undivided layer having a low thermal conductivity between the substrate and the heat blocking member.

7. The spatial light modulator of claim 5, wherein, among the layers having a low thermal conductivity, a thickness of the lowermost layer is greater than a thickness of each of remaining layers.

8. The spatial light modulator of claim 1, wherein the DBR layer is divided in correspondence to the plurality of pixels, and the heat blocking member is provided between the divided DBR layers.

9. The spatial light modulator of claim 8, wherein the DBR layer comprises:

a plurality of first layers having a first thermal conductivity; and a plurality of second layers having a second thermal conductivity greater than the first thermal conductivity of the plurality of first layers, wherein the plurality of first layers and the plurality of second layers are repeatedly alternately stacked, and wherein, among the plurality of first layers, a thickness of a lowermost first layer is greater than a thickness of each of remaining first layers.

10. The spatial light modulator of claim 8, further comprising a meta-pattern on the cavity layer between the plurality of pixels.

11. The spatial light modulator of claim 1, wherein the heat blocking member comprises a trench.

12. The spatial light modulator of claim 1, wherein a thermal conductivity of a material of the heat blocking member is less than a thermal conductivity of the substrate, a thermal conductivity of the DBR layer, and a thermal conductivity of the cavity layer.

13. The spatial light modulator of claim 1, wherein the heat blocking member is spaced apart from the plurality of pixels.

14. The spatial light modulator of claim 1, wherein the plurality of pixels comprises:

a plurality of driving pixels; and a plurality of non-driving pixels, and wherein the plurality of driving pixels and the plurality of non-driving pixels are configured to be driven by binary driving during driving.

15. The spatial light modulator of claim 1, wherein each of the plurality of active meta-patterns comprises an active high contrast grating (HCG).

16. The spatial light modulator of claim 1, wherein the plurality of pixels are spaced apart from each other, and a distance between the plurality of pixels is greater than a width of a meta-pattern.

17. The spatial light modulator of claim 1, wherein the plurality of pixels comprise:

a plurality of driving pixels; and a plurality of non-driving pixels, and wherein the plurality of driving pixels and the plurality of non-driving pixels are configured to be driven based on binary driving.

18. The spatial light modulator of claim 17, wherein the plurality of driving pixels and the plurality of non-driving pixels are spaced apart from each other, wherein each of the plurality of driving pixels comprises a plurality of active meta-patterns, and wherein a current is applied to all of the plurality of active meta-patterns included in the plurality of driving pixels.

19. The spatial light modulator of claim 17, wherein the plurality of driving pixels and the non-driving pixels are spaced apart from each other, wherein each of the plurality of driving pixels comprises a plurality of active meta-patterns, and wherein a current is applied to a portion of the plurality of active meta-patterns included in the driving pixels.

20. The spatial light modulator of claim 17, further comprising an active meta-pattern provided between the plurality of driving pixels and the plurality of non-driving pixels, and wherein a current is applied to all of the plurality of active meta-patterns included in the plurality of driving pixels.

21. The spatial light modulator of claim 17, further comprising an active meta-pattern provided between the plurality of driving pixels and the plurality of non-driving pixels, and wherein a current is applied to a portion of the plurality of active meta-patterns included in the plurality of driving pixels.

22. An apparatus comprising a spatial light modulator configured to radiate incident light, the spatial light modulator comprising:

a substrate;

a distributed Bragg reflector (DBR) layer provided on a surface of the substrate;

a cavity layer on the DBR layer;

a pixel layer provided on the cavity layer, the pixel layer comprising a plurality of pixels; and a heat blocking member between the plurality of pixels and configured to block heat transfer between the plurality of pixels, wherein each of the plurality of pixels comprises a plurality of active meta-patterns.

* * * * *